Figure 1:
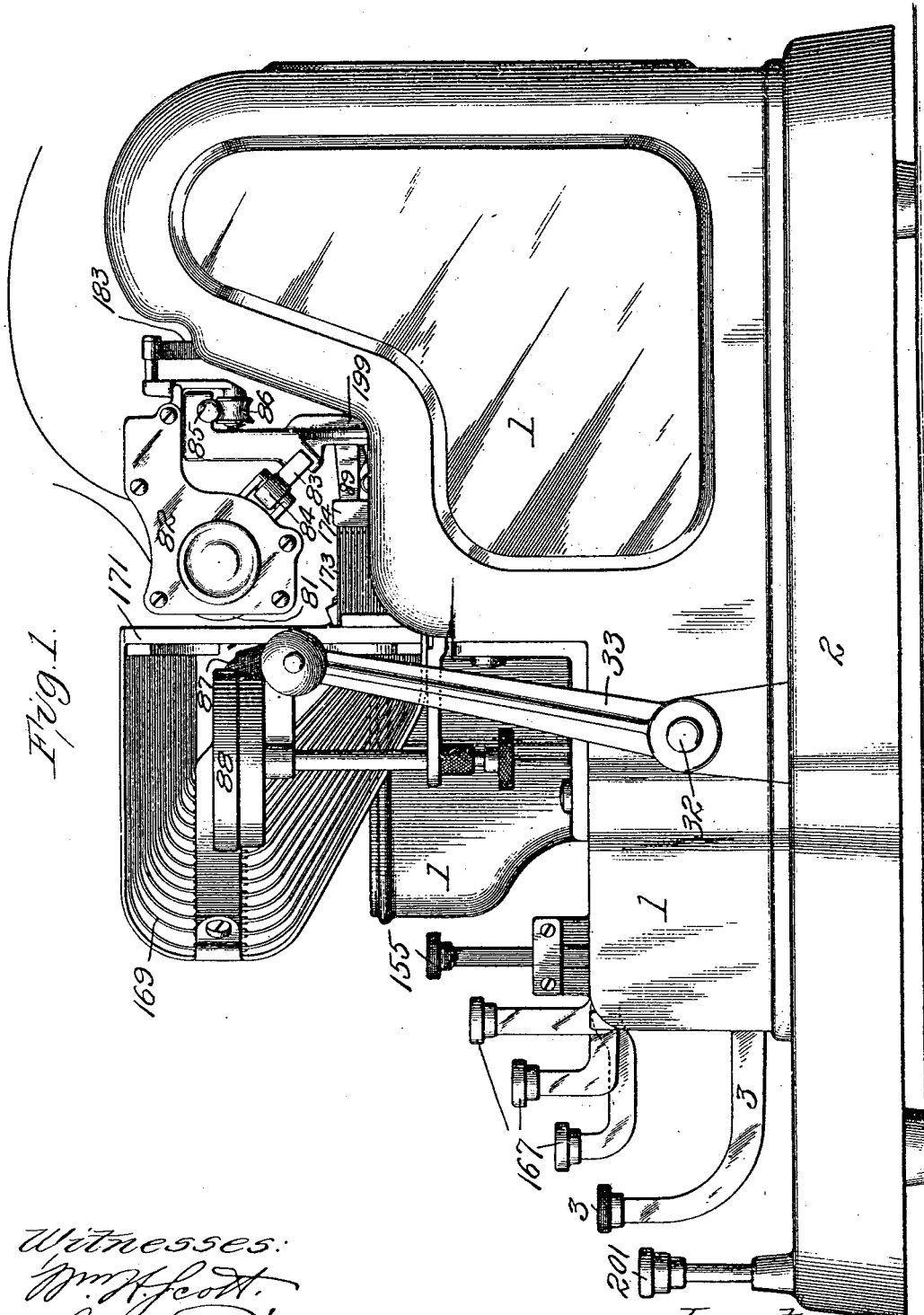

H. HOPKINS.
ADDING AND WRITING MACHINE.
APPLICATION FILED JUNE 9, 1902. RENEWED JULY 31, 1905.

1,049,093.

Patented Dec. 31, 1912.
14 SHEETS—SHEET 5.

Witnesses:
Inventor:
Hubert Hopkins
by J. D. Rippey
atty

H. HOPKINS.
ADDING AND WRITING MACHINE.
APPLICATION FILED JUNE 9, 1902. RENEWED JULY 31, 1905.

1,049,093.

Patented Dec. 31, 1912.
14 SHEETS—SHEET 6.

Inventor:
Hubert Hopkins
by J. D. Rippey
atty.

Attest:
W. H. Scott
Shaw Pitzer

H. HOPKINS.
ADDING AND WRITING MACHINE.
APPLICATION FILED JUNE 9, 1902. RENEWED JULY 31, 1905.

1,049,093.

Patented Dec. 31, 1912.
14 SHEETS—SHEET 7.

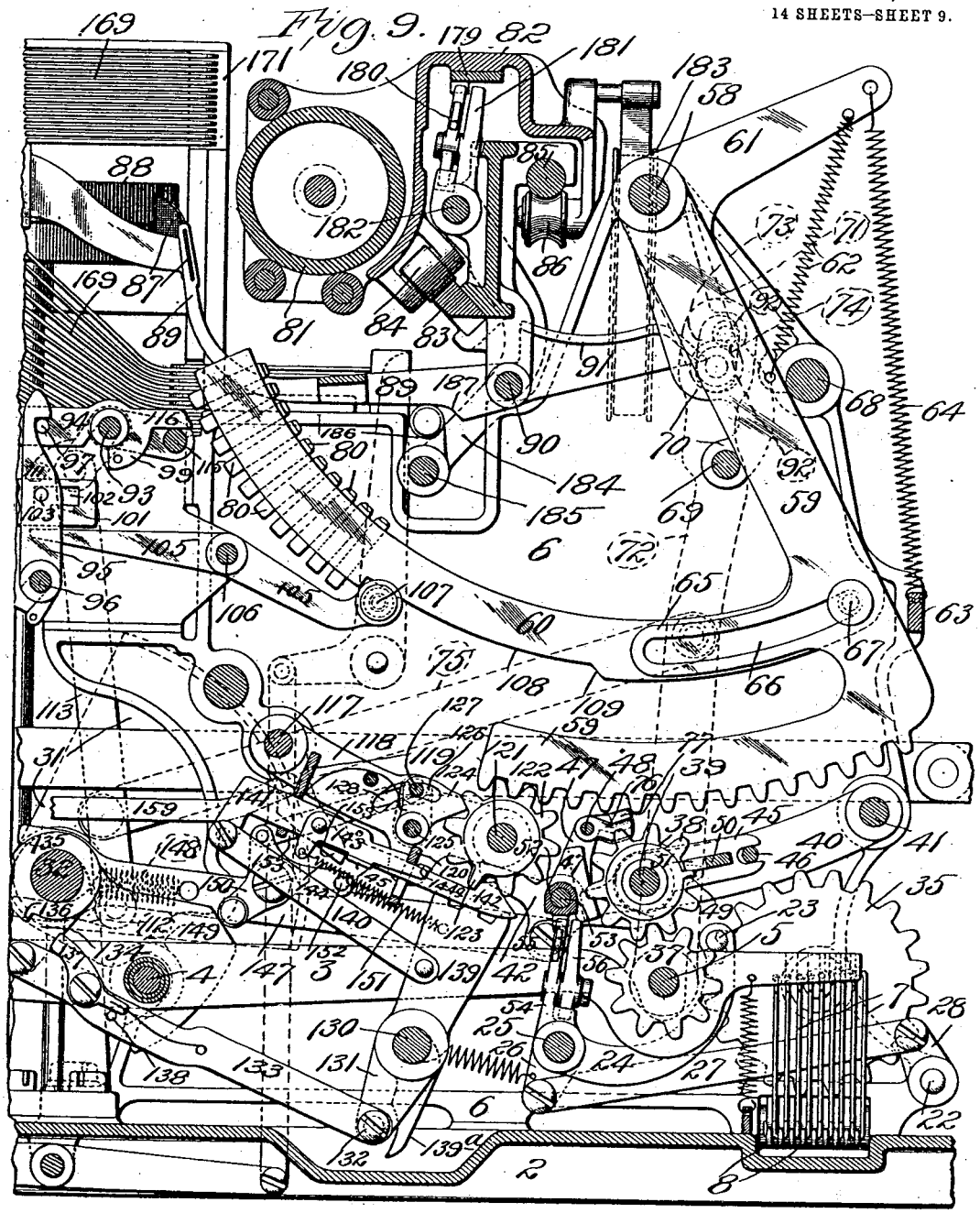

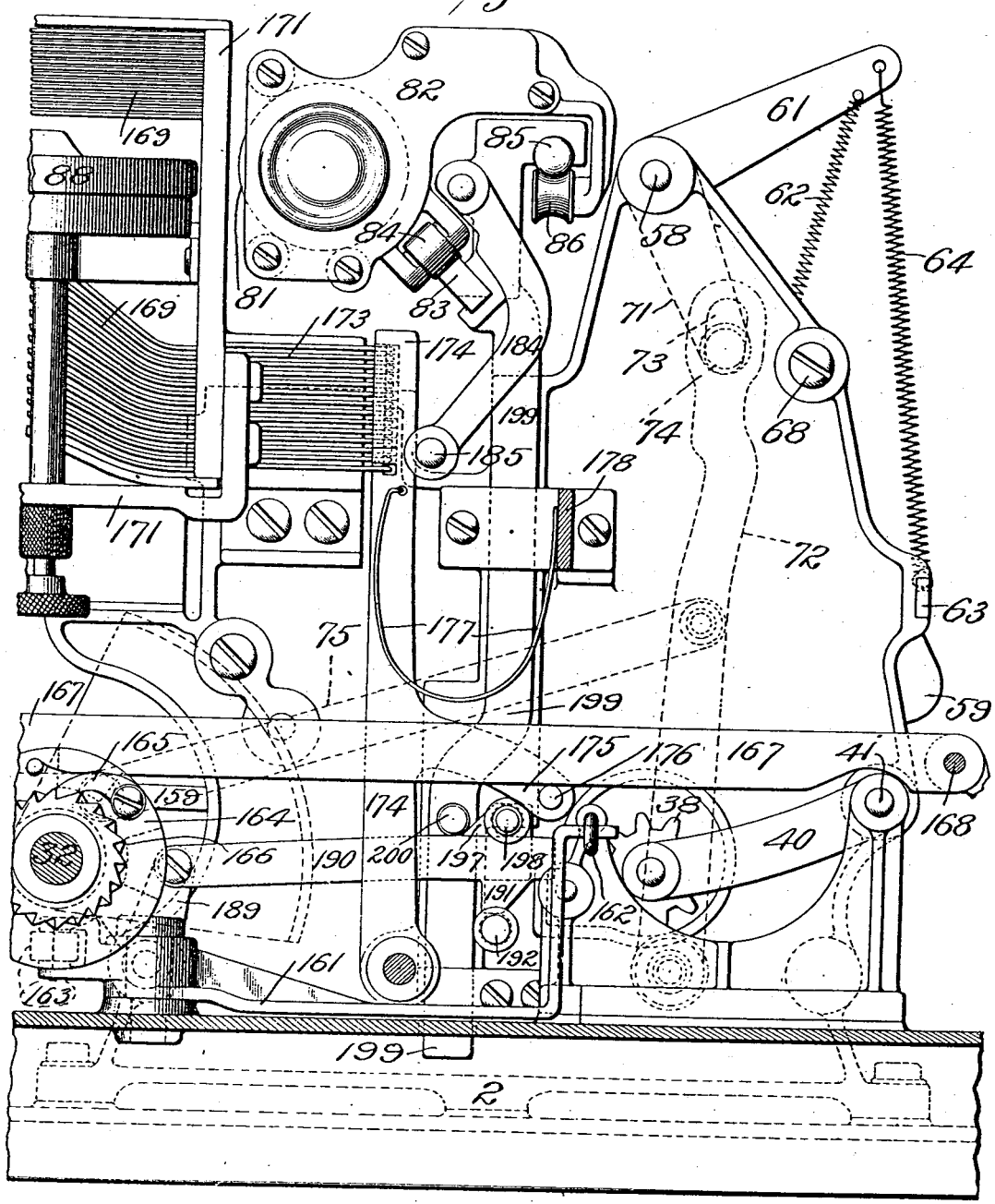

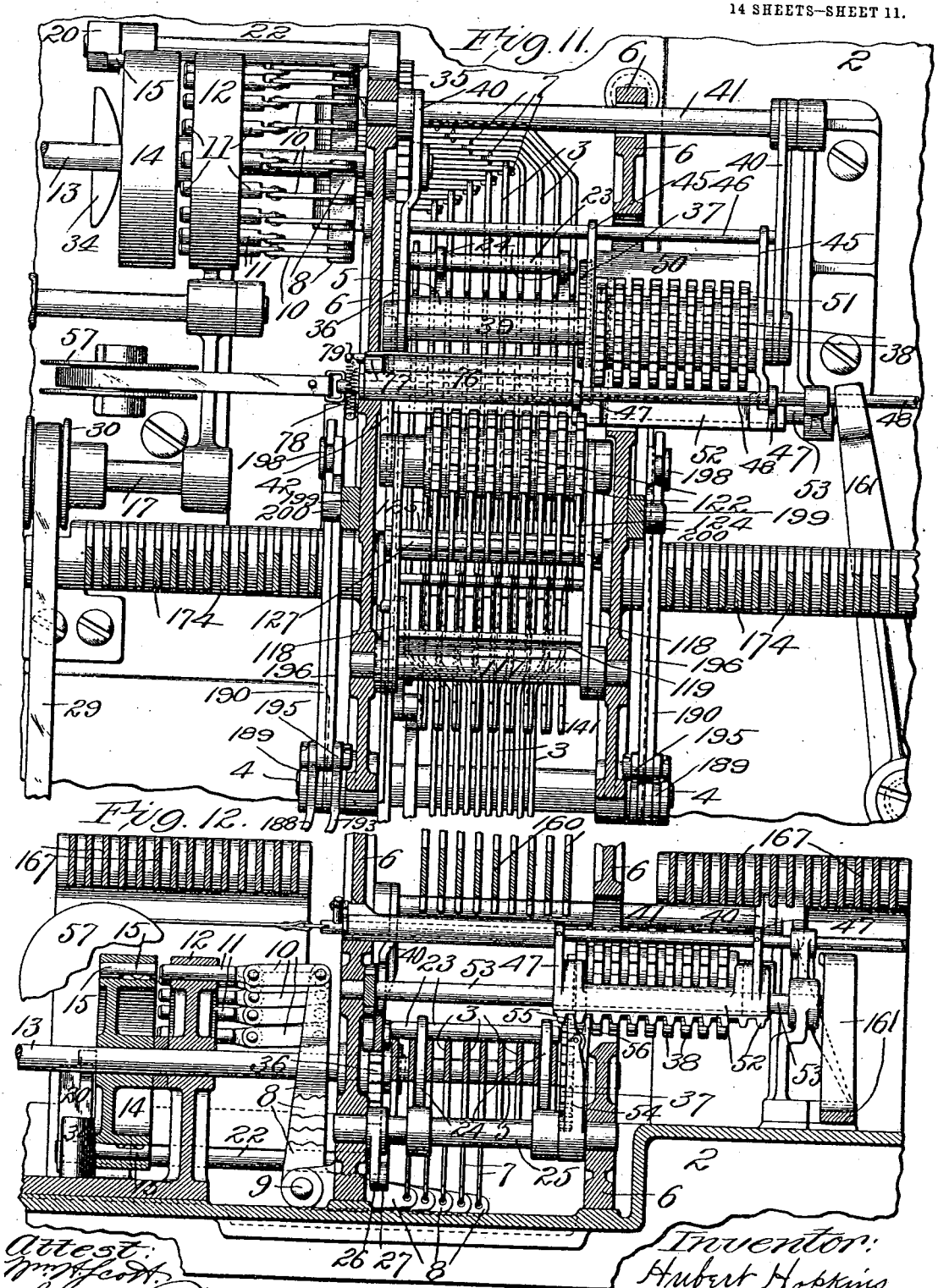

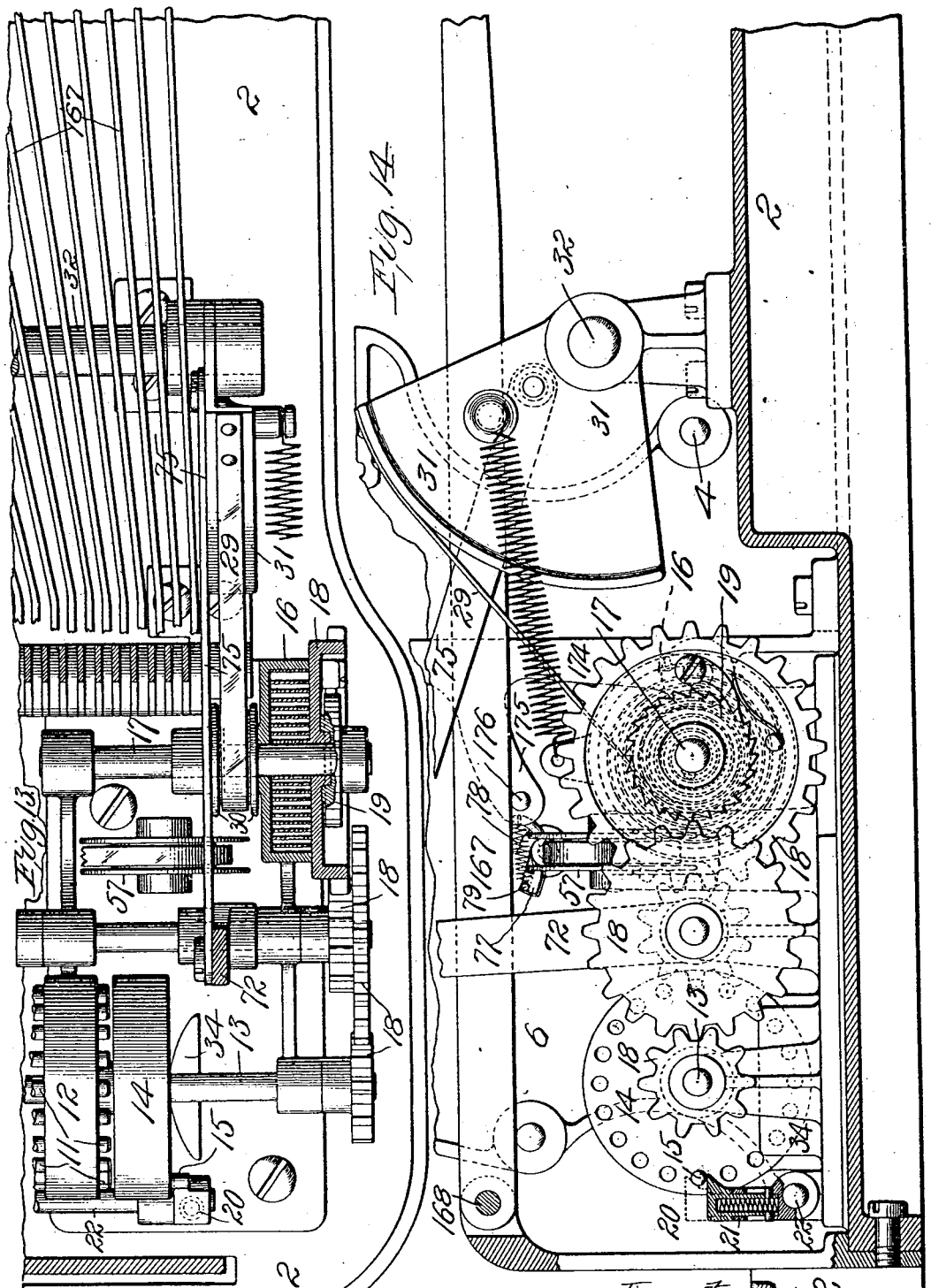

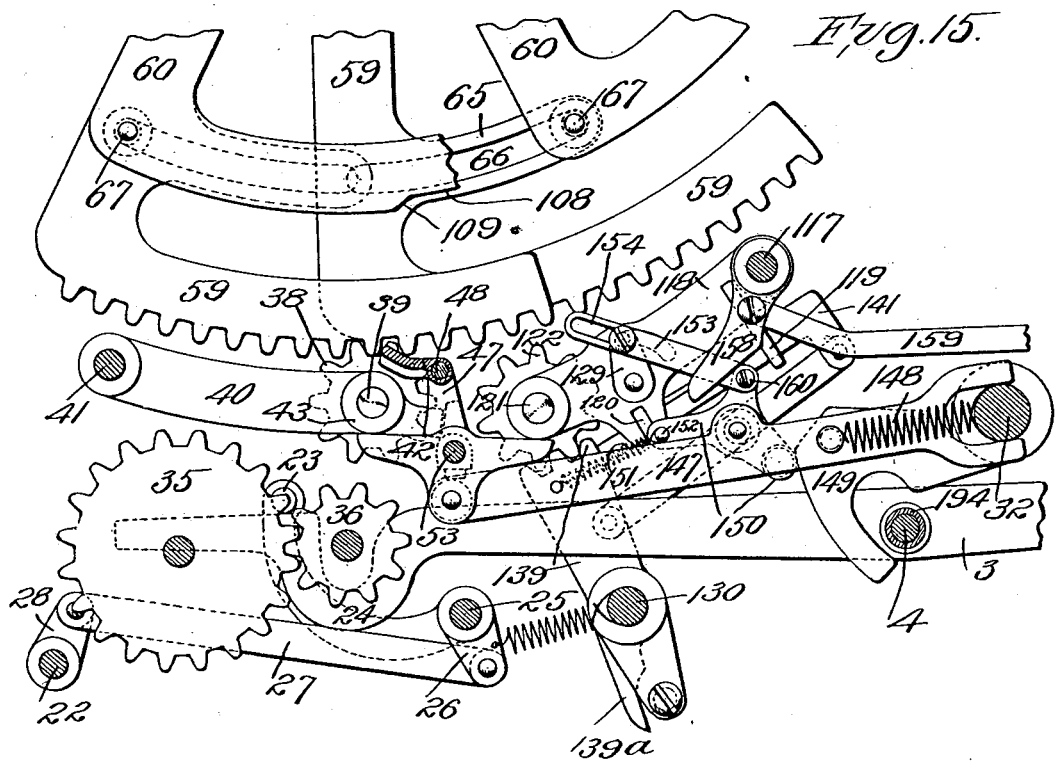
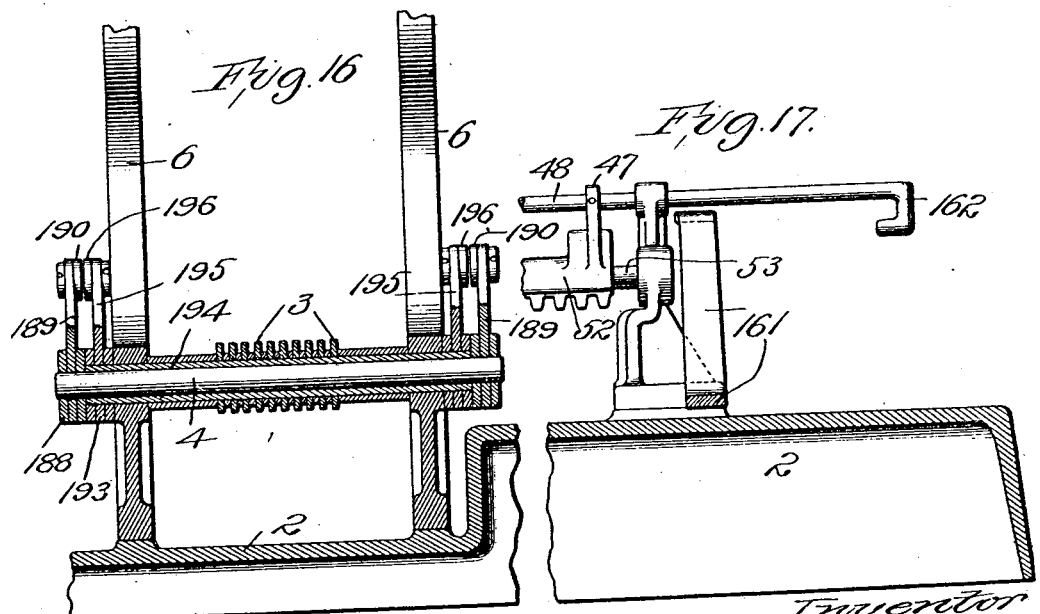

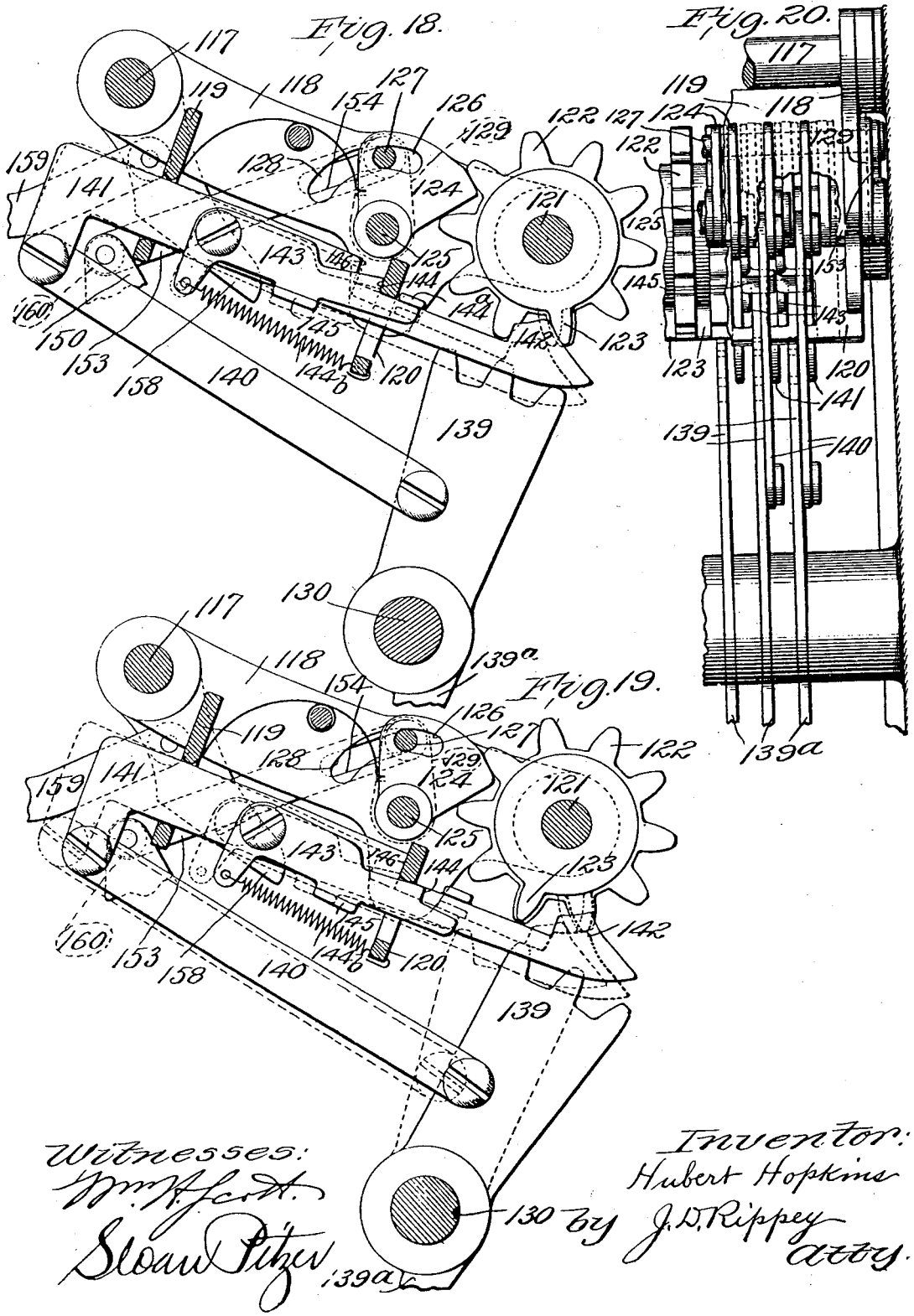

UNITED STATES PATENT OFFICE.

HUBERT HOPKINS, OF ST. LOUIS, MISSOURI, ASSIGNOR TO ADDOGRAPH MANUFACTURING COMPANY, A CORPORATION OF MISSOURI.

ADDING AND WRITING MACHINE.

1,049,093.   Specification of Letters Patent.   Patented Dec. 31, 1912.

Application filed June 9, 1902, Serial No. 110,865. Renewed July 31, 1905. Serial No. 271,985.

*To all whom it may concern:*

Be it known that I, HUBERT HOPKINS, a citizen of the United States, residing at St. Louis, Missouri, have invented new and useful Improvements in Adding and Writing Machines, of which the following is a specification.

This invention relates to adding and writing machines; and it consists of the novel construction, combination and arrangement of parts hereinafter shown, described and claimed.

One object of my invention is to produce an adding and writing machine occupying no more space than an ordinary typewriter or adding machine.

Another object is to produce an adding and writing machine having one keyboard with the fewest number of keys consistent with the range of work required of the machine.

Another object is to provide an adding and writing machine having harmonious action, without intermediate or connecting members.

A further object is to provide an adding and writing machine which will be at the immediate command of the operator for either purpose without the use of primary adjusting devices.

A further object is to provide an adding and writing machine having a common platen for the records of the typewriting and adding mechanisms.

A still further object is to produce an adding and writing machine which operates upon a common platen, and the records of which are visible to the operator without the necessity of moving any of the parts.

Another object is to produce an adding and writing machine in which commercial sheets of the usual width can be introduced, and upon which both written and arithmetical records may be made without previous adjustment.

Another object is to produce an adding and writing machine in combination so that a record of items to be added in bills of lading, invoice bills, bank checks, or other itemized accounts may be made upon the same sheet in connection with each item therein.

There are other objects not specially mentioned, which are accomplished by this machine, and all will appear from the following description, also referring to the drawings.

Figure 2:
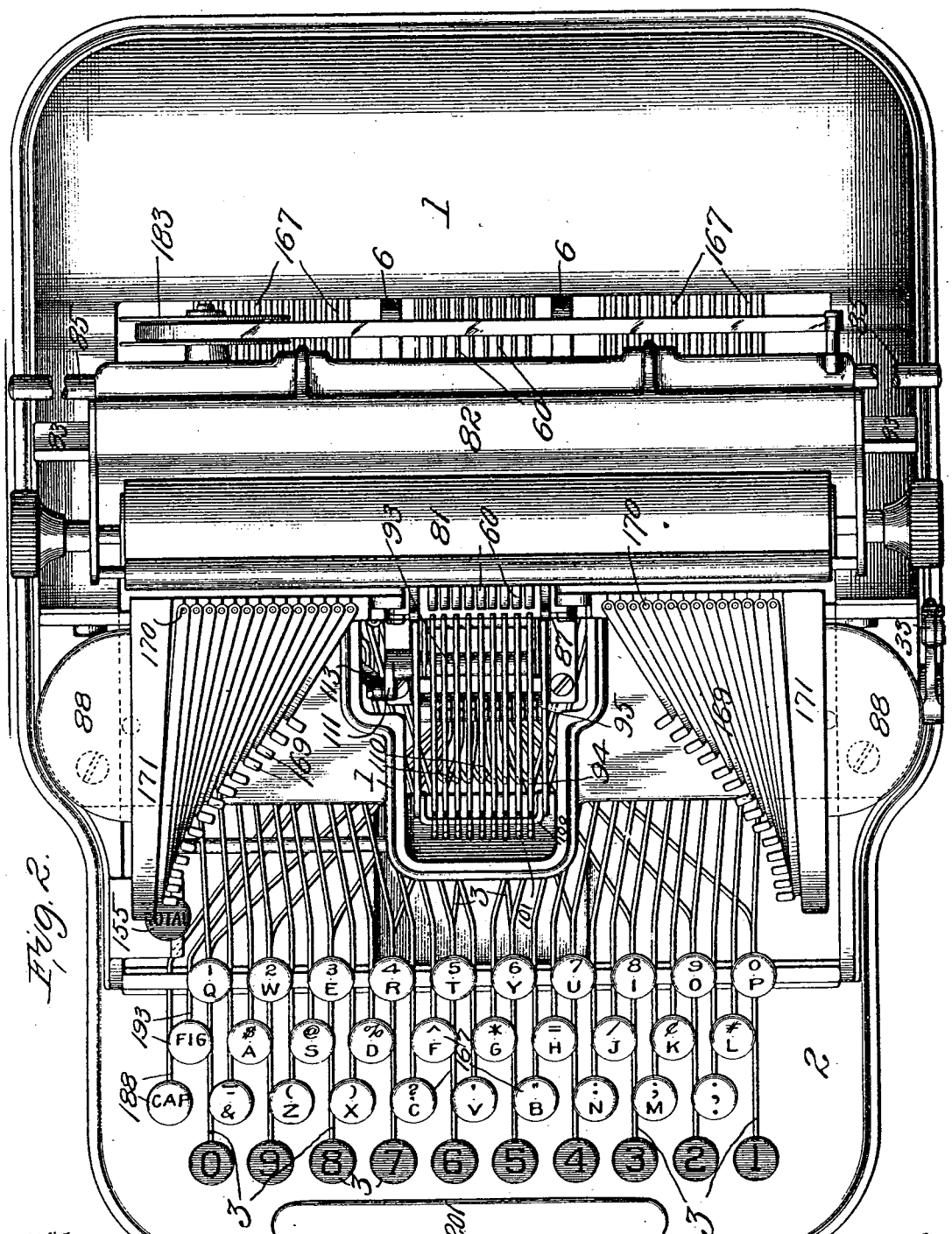
Figure 3:
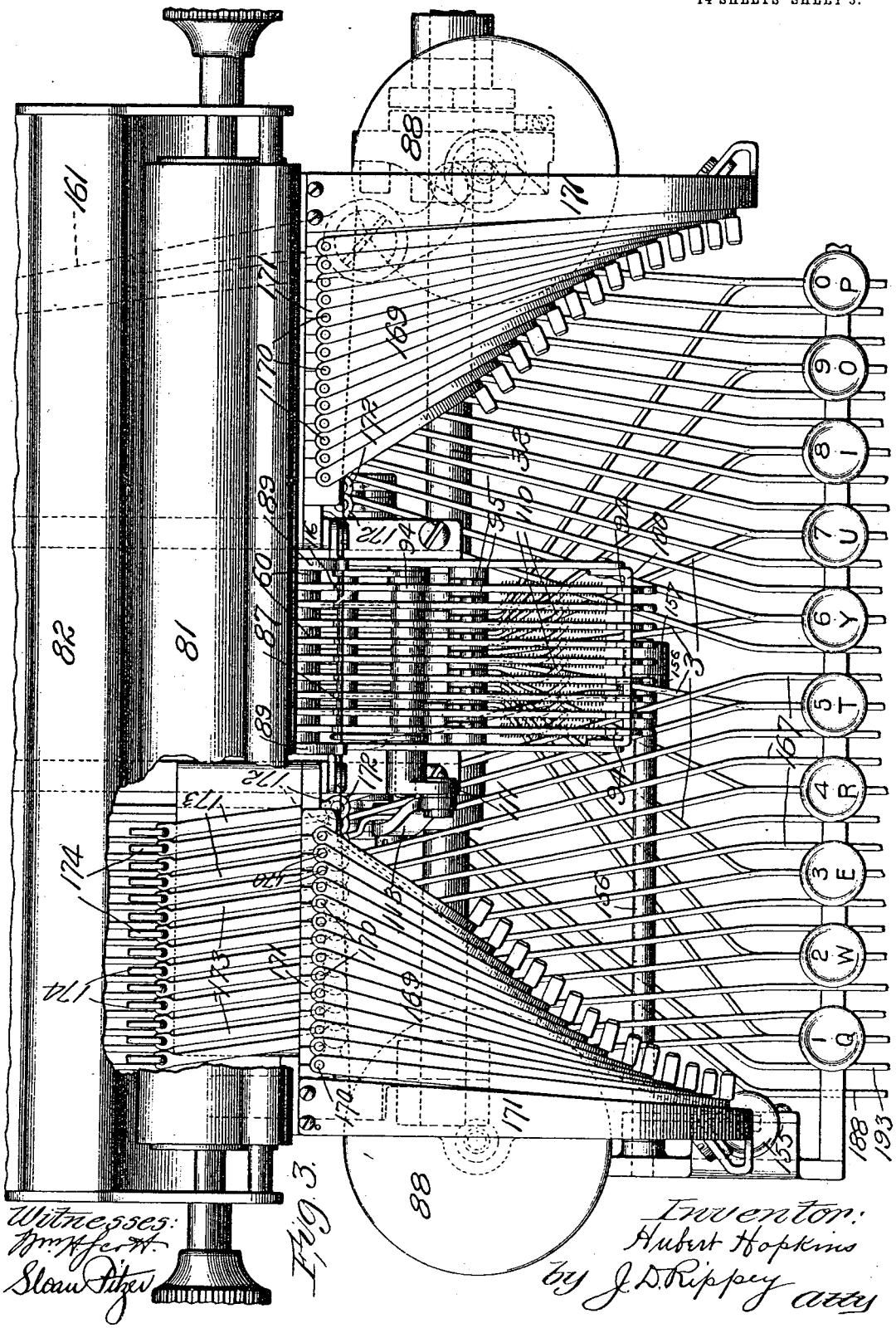
Figure 4:
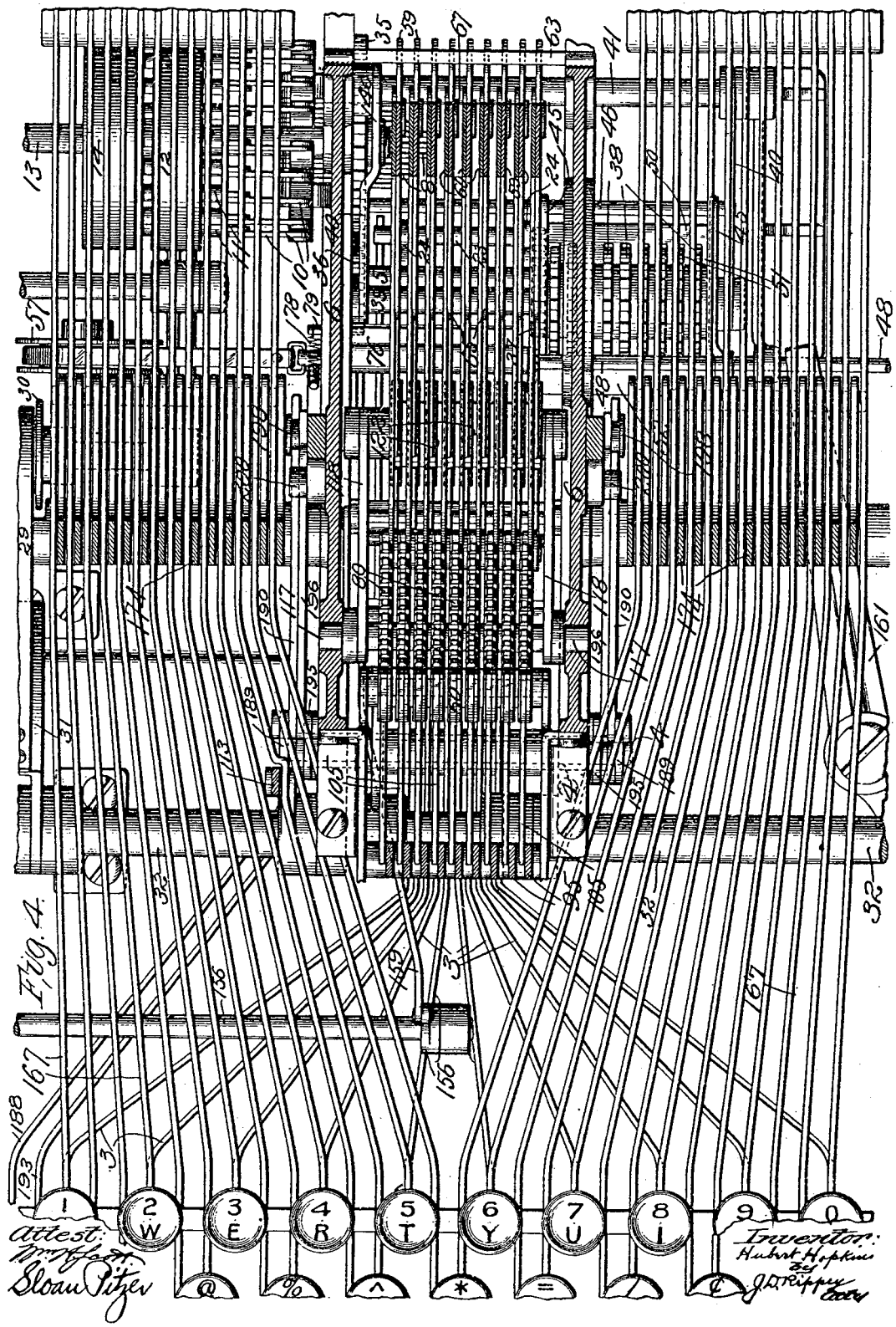
Figure 5:
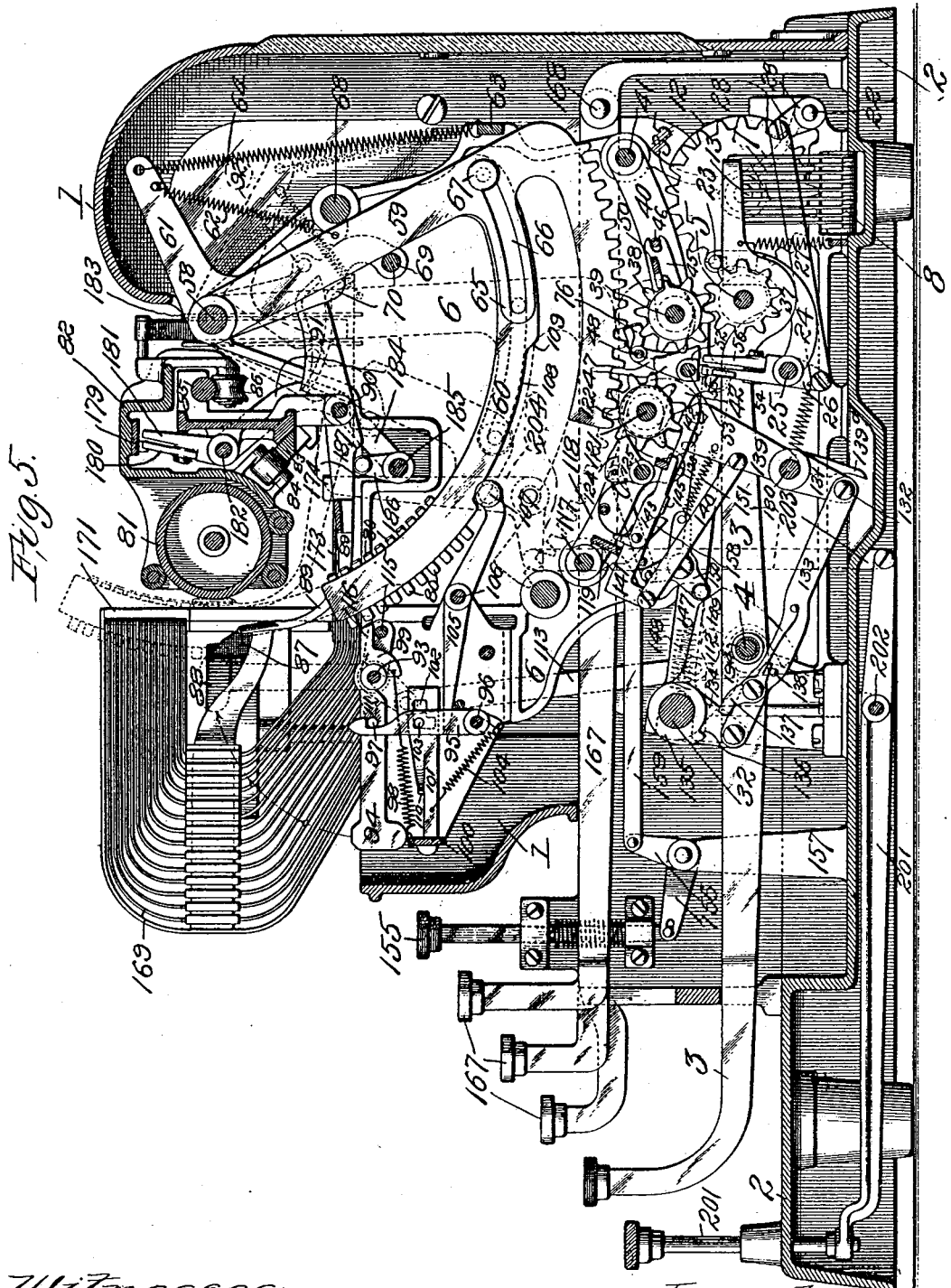
Figure 6:
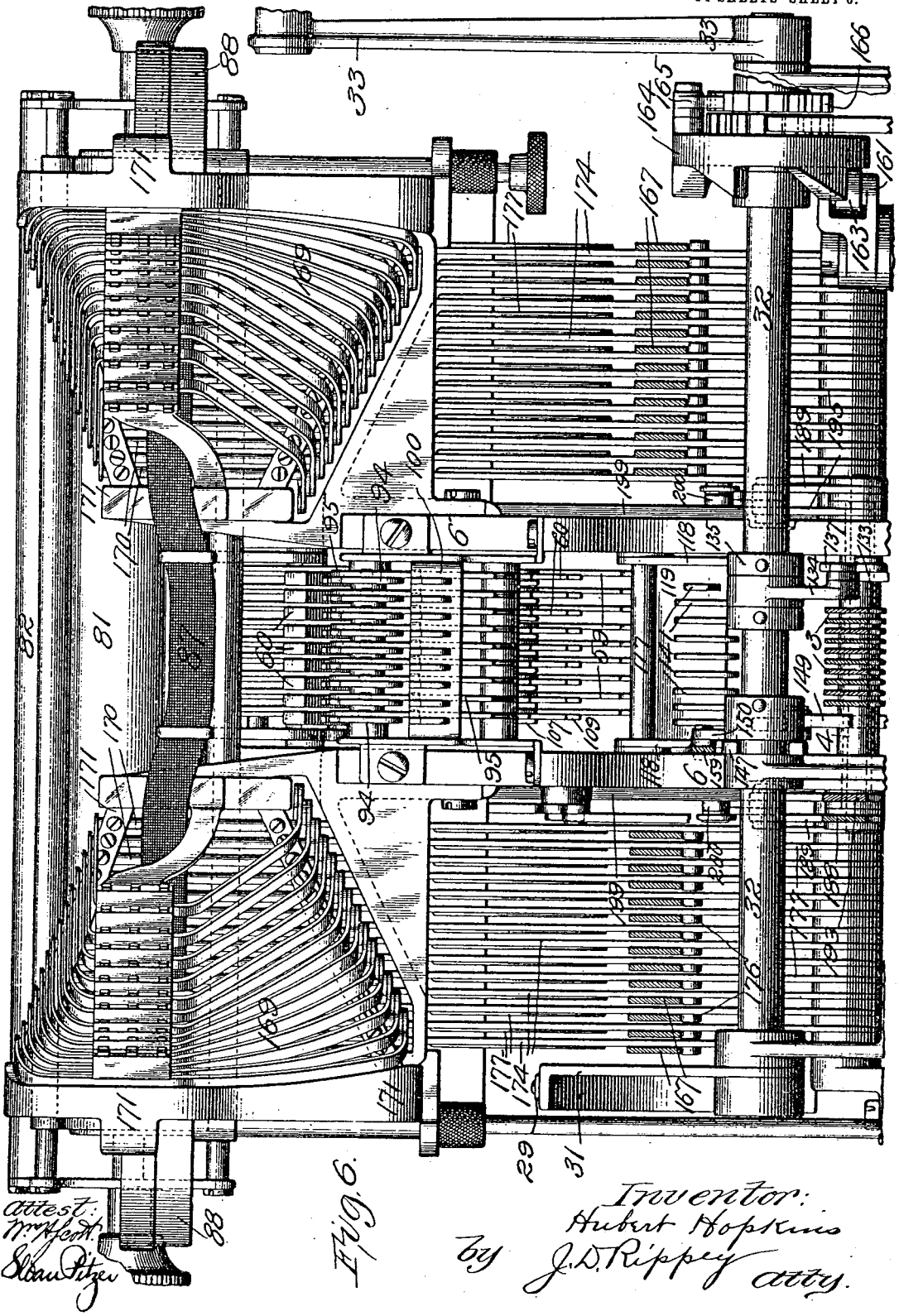
Figure 8:
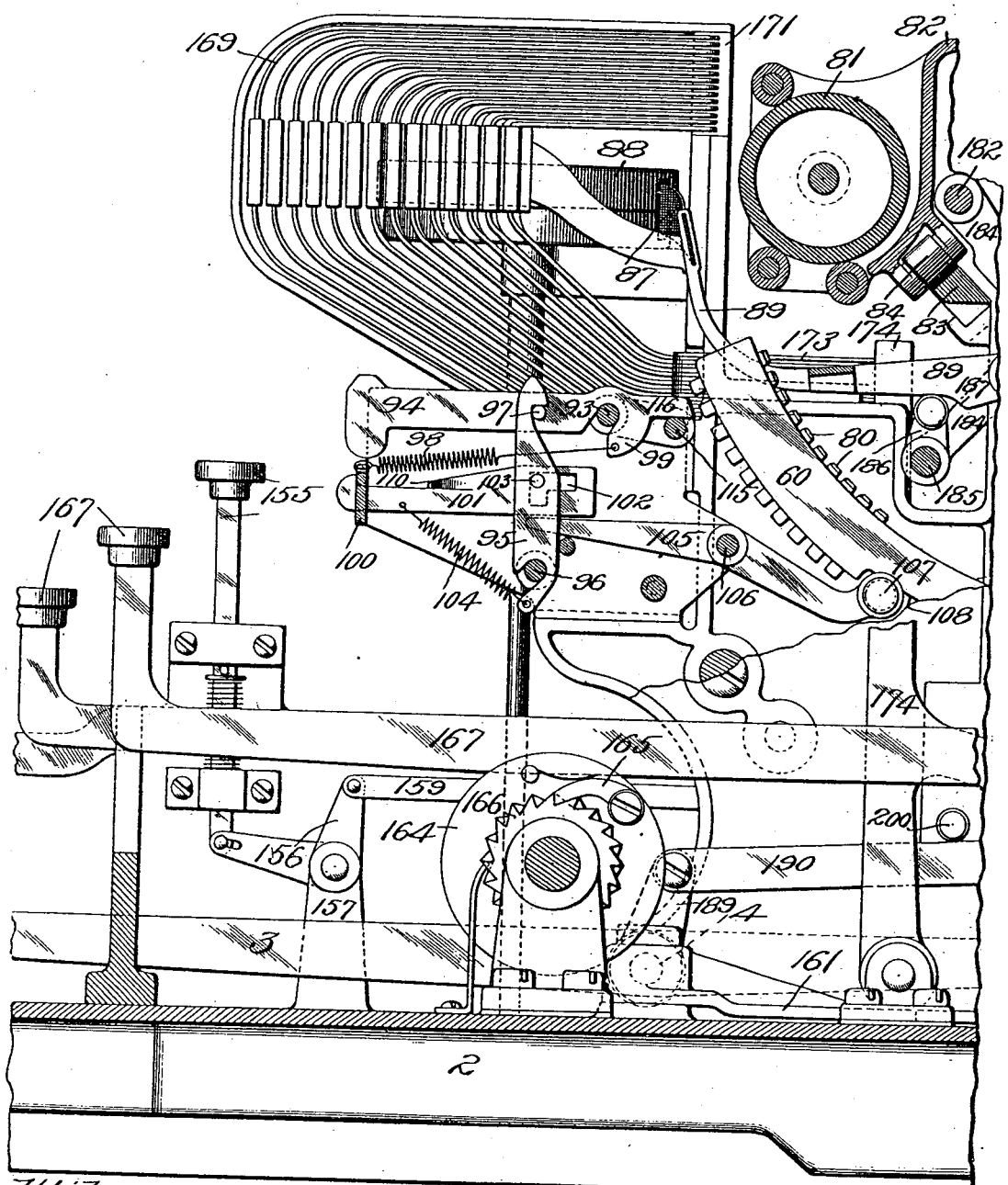

Figure 1 is a side elevation of the complete machine. Fig. 2 is a plan view. Fig. 3 is an enlarged plan of the central part of the machine. Fig. 4 is a horizontal longitudinal section showing the interior of the machine. Fig. 5 is a vertical longitudinal section of the entire machine, taken through the center. Fig. 6 is a vertical cross section through the front of the machine, looking toward the rear. Fig. 7 is a view of the rear end of the machine with the case removed. Figs. 8 and 9 represent longitudinal sectional views of the front and rear of the machine. Fig. 10 is a side view of the writing mechanism. Fig. 11 is a plan view of the adding mechanism. Fig. 12 is a sectional view of the adding mechanism. Figs. 13 and 14 are views illustrating a rotary escapement which controls the movement of the adding mechanism. Fig. 15 is an enlarged view of a part of the adding mechanism. Fig. 16 is a sectional view of a part of the device for raising and lowering the platen frame. Fig. 17 is a detail view of a part of the devices which control the movable frame. Figs. 18, 19 and 20 are enlarged views of the totalizing device, showing the different positions of its different parts in the process of carrying from a lower to a higher order.

This machine serves two functions—that of a typewriter and that of an adding machine. It can be used for either purpose without change or alteration; it can also be used as an adding machine and a typewriter at the same time, and the arithmetical and written records printed on the same sheet of paper. A single platen is used and all the keys are in one keyboard, there being ten keys for the adding department and about the usual number for the typewriting department. The adding department of the machine is in the center, and the writing department is at the sides. There are no intermediate connections governing the operation of the two departments of the machine, and a change of use can be made from one to the other at any time without previous adjustment. Most of the mechanism of each department is located in the case 1, which rests upon a base 2, the latter also supporting the inner frames, standards, etc., which uphold the movable parts. The adding department keys preferably form a separate row—the lower row in this instance—and their key bars 3, after passing through openings in the front of the case, converge toward the center and about midway of the front and rear of the machine, these key bars again extend parallel, spaced a short distance apart and are all pivoted upon a common shaft 4. These key bars extend to the rear beyond the shaft 4 and curve under the shaft 5 which is supported between the inner frames 6 so as to allow them free upward movement. A link 7 connects the rear end of each of the key bars with a bell-crank 8, the latter being mounted on a shaft 9 just outside of one of the frames 6. The upper ends of this bell-crank are in circular alinement, and are connected by the links 10 with the plungers 11, which operate in openings formed in the frame 12 mounted upon the base 2. A shaft 13 projects through the frame 12 and a drum-wheel 14 is mounted thereon rigidly. Figs. 11, 12 and 13. Near the periphery of the drum-wheel 14 is formed a number of openings in which are located the pins 15, which are alined with the plungers 11 so that when the latter are driven outward by the operation of the keys they will enter the openings in which the pins lie and drive them outward. By referring to Fig. 12 it will be seen that the pins will be retained against accidental displacement from any location in which they may be placed, by means of small bow springs, one of which is in each opening, and each spring bearing against the pin and the side of the opening wherein it is located. The drum wheel 14 is driven by a spring motor 16 on a shaft 17, through the medium of a series of gear 18, the tendency of the motor is to turn the drum wheel 14 toward the rear. The gear 18 which is attached to the motor 16 is loose on its shaft 17, but has a ratchet connection 19 which secures them together. These parts are normally held against movement by a stop which engages with the last pin 15 which had been operated. This stop consists of the spring-actuated member 20 operating within a socket 21 rigid with a rock-shaft 22. Whenever any one of the key bars 3 is operated the stop 20 is withdrawn out of engagement with the pin 15 last engaged thereby in the following manner.

Lying across the key bars 3 is a rod 23 to which are connected the upper ends of the curved arms 24, the lower ends thereof being rigid with a rock-shaft 25, below the said key bars. A depending lever 26 is attached to the rock-shaft 24 and a link 27 connects the same with a lever 28 on the shaft 22. Hence the operation of a key has two immediate results—it drives the corresponding pin 15 beyond the outer surface of the drum wheel 14, and through the medium of the parts just described moves the stop 20 out of engagement with the other or preceding pin 15 whereby it was holding the wheel 14 against movement. Just as soon as the stop is freed from the pin 15, it is thrown upward by its spring and when the key is released it assumes the position shown by dotted lines in Fig. 14. The plunger 11 is at the same time withdrawn from the opening in the drum wheel 14 and the latter is then driven by the motor 16 until the pin 15 last operated comes upon the stop 20 and depresses the same into its normal position. This limits the movement of the parts and results in registering a number corresponding to the key operated. The spring of the motor 16 can be rewound by the tape 29 connected at one end to the pulley 30 on the shaft 17 and at the opposite end to the segment 31 on the main shaft 32. The shaft 32 is operated by a handle 33 and after each operation of the escapement consisting of the drum wheel 14 and the wheels 18, the spring is rewound by operating the handle 33 which draws the segment 31 forward and rotates the shaft 17 thereby rewinding the spring of the motor 16, which is held by the ratchet and pawl 19. The pins 15 are restored to position within the drum wheel 14 by contact with a stationary cone 34 near the lower side of said drum-wheel. The cone 34 which is shown in Figs. 11, 12, 13 and 14 consists of a block having its rear end beveled on the side adjacent to the drum wheel 14 so that as the wheel turns the ends of the projecting pins 15 will wipe along the beveled surface and eventually be pushed into place within the openings. The shaft 13 has a gear 35 on its inner end and said gear meshes with the pinion 36 on one end of the shaft 5 above referred to. Said shaft 5 also has a gear 37 on its right hand end, just outside of the row of key bars 3 (see Fig. 11). This gear is located relative to the key bars so that it in no way interferes with their operation.

I have now traced the operation of the machine through the key bars to the escapement, of which the drum-wheel 14 forms a part, and thence to the shaft 5, and the gear wheel 37. The gear 37 operates the rotary stops 38 which control the movement of the type carriers when the machine is in operation. These rotary stops are mounted on a sleeve upon the shaft 39 which is supported by the arms 40, the latter having their rear ends pivoted to the shaft 41. The frame thus formed is supported by one end of a T-shaped lever 42 which extends under a projection 43 at the left side of the frame. See Figs. 9, 11 and 15. The said lever is mounted on a shaft 53 supported in front of the frame, the purpose of said lever being to uphold the frame and raise it when required to place the rotary stop wheels 38 in mesh with the gear and type carrying sectors.

To each end of the sleeve on the shaft 39 is attached an arm 45 the rear ends of which have slots formed therein to receive the rod 46, the latter being supported in the frame 40. The front ends of the arms 45 are at the inner sides of the vertical arms 47, which are rigidly attached to a transversely movable rod 48 supported by one of the inner frames 6 and an outer bearing. The normal position of the rod 48 is shown in Fig. 11, the stop wheels 38 being at the right of the machine and the left one of said wheels being in mesh with the gear 37 on the shaft 5. The wheels 38 may be termed digit stops since each is provided with ten teeth representing the ten figures and when operated limits the movement of a type carrier, to represent the digit or figure indicated by the key which had been struck. They are normally in position so that when the type carriers are released, said type carriers will carry the "0" type in front of the platen without movement on the part of the digit stops. Each digit stop wheel is provided with an integral lug 49 on one of its teeth, the purpose of which is to stop them in the correct position to register the required number. A plate 50 is secured between the arms 45 behind the digit stop wheels 38, and said plate is provided with a series of projecting teeth 51, which extend between the stop wheels 38 and hold them in position. The normal position of the stop wheels is that shown in Fig. 9, the lugs 49 bearing against the under side of the teeth 51 so as to prevent the wheels from turning forward, in which direction they do turn when the type carriers are moving to printing position. The arms 47 which have their upper ends rigidly secured to the rod 48, are integral or rigid with a rack 52 at their lower ends. Said rack 52 is in the form of a sleeve with teeth on its lower side, and is mounted upon a shaft 53, below the rod 48. Hence it is apparent that the rack 52 controls the lateral movement of the stop wheels 38 and the movement of the rack is governed by an escapement which I will now describe.

On the rock-shaft 25 is fixed an arm 54 having an escapement pawl 55 pivoted to its upper end and forming a knuckle joint so that it can bend to the right. Another arm 56 is pivoted to the arm 54 and normally forms a fork therewith, and the distance between the upper ends of the arms 55 and 56 is equal to one tooth on the rack 52. The rod 48 and rack 52 are drawn to the left by a spring motor 57. Their operation is as follows: When a key is operated the shaft 5 and gear 37 are rotated forward through the medium of the rotary escapement above described. As stated, the gear 37 is in mesh with the stop gear 38 at the left, and hence this stop gear will be turned the same distance as the gear 37 and will represent the digit struck on the key. Now the stop gears are moved step by step to the left and assume their places under the type carriers (hereinafter described) in the following manner:—Whenever any key is operated, the shaft 25 is rocked by the arms 24 and this moves the escapement pawl 55 out of engagement with the rack 52, and moves the arm 56 into engagement with said rack. The arm 56 being pivoted on the arm 54 permits the rack 52 to be drawn toward the left one step or tooth, bringing the upper end of the arm 56 into alinement with the end of the pawl 55 in opposition to the force which holds said members apart. Now the key is released and the arms 24 resume their lowered position and rock the shaft 25 to disengage the arm 56 from the rack 52 and again engage the pawl 55 therewith. The rack is thus drawn one tooth to the left by the spring motor 57, and this operation moves the series of rotary stop wheels 38 one step to the left and brings the second one of the series into mesh with the wheel 37. This operation is repeated every time a key is operated, the digit stop wheel being first operated by the wheel 37 and then shifted to the left by the operation of the escapement.

In the center of the machine the gear and type carriers are located, spaced the same distance apart as the digit stop wheels, the operation of which I have just described. These type-carriers consist of two series and all are supported on a shaft 58. The series 59 are racks and when operated mesh with the digit stop wheels 38 which limit their forward movement and cause the desired figures to be registered. The parts 60 carry the type and are longer than the part 59 in order to extend in front of the platen to record. The type-carrier 60 is provided with an arm 61 which is connected with the rack 59 by a spring 62, so that it will be thrown forward independent of the rack 59 when released. The arm 61 is also connected with a stationary bar 63 by a spring 64, so that both type-carrier and rack will be moved forward after the sector 60 has reached the limit of its independent movement. An arm 65 is integral with the type-carrier 59 and a curved slot 66 is formed therein, said slot being concentric with the shaft 58. The sector 60 has a pin 67 extending through the slot 66, thereby connecting the type-carrier and rack but allowing the rack 60 an independent forward movement, limited by the length of the slot 66. A cross rod 68 holds all the type-carriers and racks against backward movement, and they are held against forward movement by a rod 69 supported by the depending arms 70 rigidly attached to the rock-shaft 58. The arms 70 and the rod 69 are drawn forward to release the type carriers in the following manner:—A lever 71 Fig. 7 is attached to the shaft 58, and when said lever 71 is moved forward the shaft 58 is rocked and the arms 70 and the rod 69 will also be moved, thereby releasing the type carriers and allowing them to move to proper printing position, actuated by their springs 62 and 64. A lever 72 is mounted at its lower end on the shaft 5, and in its upper end a slot 73 is formed, Fig. 10 said slot receiving a pin 74 on the lever 71. A link 75 connects the lever 72 with the segment 31, which, as explained heretofore, is operated by the lever 33. Hence when the lever 33 is drawn forward the lever 72 will be operated which will release the type carriers by carrying the rod 69 forward. However only those racks will move forward which are required to register some figure in the number struck on the keys, the remainder of the racks at the left being held by a lock-bar 76 mounted on the movable rod 48. Said lock-bar normally occupies the position shown in Fig. 11, but is held down out of engagement with the teeth on the racks 59 by an enlargement 77 which bears against the edge of the opening in the side frame 6 through which the said lockbar is moved. However, at the first step of the movable rod and frame to the left, the enlargement 77 is removed from engagement with the frame 6 and the lock-bar is then drawn into engagement with the racks by a spring 78 connecting a pin 79 on one end of the lock-bar with a projection on the rod 48. At each step to the left of the movable rod 48 and the rotary digit stops, one additional type carrier rack is released from the lock bar so that they can move forward to registering and recording position when the rod 69 is moved away from them. Thus the other racks and their corresponding type-carriers will be held when a series of them is released to add and record any number. The type 80 are carried by the type-carriers 60 near their forward ends, each carrier carrying ten type—for the nine digits and for "0." These type have their printing surfaces inside the arcs of the type-carriers 60, and are so mounted on their respective type-carriers as to admit of a short longitudinal movement toward the shaft upon which the type-carriers are mounted. Hence when the type-carriers operate to record any number, they project in front of the platen and the type have sufficient movement to be driven against the platen or ink ribbon to print the number. As before stated, the type-carriers 60 can move the length of the slots 66 independent of the racks 59, and this movement brings the uppermost type of the type-carriers in front of the platen 81 ready to print. This platen is of the usual construction and is supported by a frame 82 which travels on a track consisting of a bar 83 for the rollers 84 and the rod 85, for the rollers 86. The ribbon 87 is wound on the spools 88 and passes through the guides 89 normally held some distance in front of the platen as shown in Fig. 9. The guides 89 are in the form of levers and are rigid upon a rock shaft 90 supported by the inner frames of the machine. One of said levers projects to the rear of the shaft 90 and terminates adjacent to one of the arms 70, and is provided with a flange 91 integral with its upper edge and the upper corner of the rear end of said lever is rounded off as shown in Fig. 9. A pin or projection 92 on the arm 70 passes onto the rear end of the lever 89 and lowers the same whenever the arms 70 are moved forward to release the type carrying sectors. This lever is operated just enough to bring the ribbon 86 close to the platen 81, so that when the hammers strike the type the latter will be driven against the ribbon and thereby print upon the paper.

A rock-shaft 93 is supported in front of the ends of the type-carriers 60 and the hammers 94 are pivotally mounted thereon and normally occupy a horizontal position as shown in Fig. 8. Said hammers are held in this position by the pawls 95 carried by a shaft 96 and having hooks on their upper ends which engage over pins 97 on the said hammers. A spring 98 is provided for each hammer 94 and has one end connected to a projection 99 integral with said hammer below the shaft 93 and the opposite end connected with a cross piece 100 under the forward ends of the hammers. (See Fig. 8.) It is apparent that when the pawls 95 are disengaged from the pins 97 the hammers 94 will be thrown upward by the springs 98 and will strike against the type and drive them against the ribbon 86 to print the number which had been struck on the keys. Each pawl 95 is provided with a latch mechanism consisting of a slide 101 having its front end mounted within an opening in the cross piece 100 and an angular slot 102 near its rear end which receives a pin 103 on the pawl 95, the said pin normally being near the front end of the slot as shown in Fig. 8. The said slide is connected with the lower end of the pawl 95 by a spring 104, so that the pawl will be held in its vertical position to hold the corresponding hammer 95. It is thus apparent that the slides 101 can be pushed forward without interfering with the pawls 95, but if the rear ends of the slides be raised to bring the pins 103 to the lower parts of the slots 102, and the slide be pushed forward, then the pawls 95 will be disengaged from the pins 97 thereby releasing the hammers 94 and they will be thrown upward by the springs 98. For each of the slides 101 there is a lever 105, the latter being mounted on a rod or shaft 106 supported transversely by the frames of the machine below the forward ends of the type-carriers 60. The rear ends of the levers 105 terminate near the under edges of the type-carriers 60, and each lever preferably carries a roller or other lateral projection 107 which rollers are very close to the type-carriers 60. There is a cut-away portion 108 in the under side of each type-carrier 60, and said cut-aways are of about equal length with the slots 66 (see Fig. 9). A shoulder 109 is at the rear end of each cut-away, and when the type-carriers 60 have reached the limit of their independent forward movement, the rollers 107 are ready to engage upon the shoulders 109. Then when the racks 59 travel forward the type-carrier 60 also move and thereby lower the rear ends of the levers 105 and raise their front ends, and each lever raises its corresponding slide 101 to engage the pin 103 in the lower part of the slot 102. This, however, occurs only with those sections which are required to operate to register the number which had been struck on the keyboard. If, however, it is necessary to add and record a number having a "0," the carrier which carries the type for that character will not operate its lever 105 and hence the slide 101 will also not be operated by that section. To overcome this and to trip the slide and release the hammer 94, which must strike the "0" type, each slide 101 is provided with a projection 110 extending to the right and engaging under a projection or shoulder on the left side of the adjacent slide so that if one slide in the series be raised all the others at its right will also be raised. As stated heretofore, the shaft 93 is a rock-shaft and on one end thereof is a lever 111 projecting forward and on the shaft 32 is another lever 112 projecting rearward (see Fig. 9). These two levers are connected by a link 113. When the shaft 32 is rocked by the lever 33, the lever 111 will be raised and the shaft 93 and a rod 115 is supported thereby, and when the said shaft 93 is rocked as described, the rod 115 is brought against the rear ends of the slides 101 and pushes them forwardly. Those slides which had been raised trip their pawls 95 and release the hammers 94 held thereby, while those sildes which had not been raised are pushed forward, the pins 103 sliding longitudinally in the slots 102, and hence not releasing the corresponding pawls 95. When the lever 33 is released and the shaft 32 is restored to its former position the hammers 94 will also be returned to normal position by the rod 115 which engages with the projections 116 on the lower or rear ends of the hammers 94 and thereby returns them to position in opposition to their springs 98. The pawls 95 are held vertically all the time and their upper ends are beveled so that the pins 97 can readily be moved into engagement therewith when the hammers 94 are lowered. The type carriers are also restored to idle position by the rod 69 which is forced back by the link 75 and other connections leading from the shaft 32. The backward movement of the racks 59 also operates the totalizer, which I will now describe.

A shaft 117 is supported by the inner frames some distance in front of the ends of the racks 59 and upon said shaft is pivoted a frame consisting of the side plates 118, a cross piece 119 near the shaft 117, and another cross piece 120 same distance toward the rear. A shaft 121 is carried by the rear ends of the side plates 118 and said shaft is below the forward ends of the racks 59, as may be seen in Fig. 9. Mounted upon the shaft 121 is a series of totalizer wheels 122, one for each rack 59 and located immediately below the same and normally in mesh therewith. (See Fig. 9.) One end of the shaft 121 carries a collar which rests upon one arm of the T-lever 42, which lever also upholds the front end of the frame carrying the rotary digit wheels 38. It is manifest that when the lever 42 is operated to raise the wheels 38 into mesh with the racks 59, the wheels 122 will be lowered out of mesh with said racks. Each wheel 122 has ten teeth, one for each figure, and one tooth on each wheel is provided with a lug or side tooth 123, the function of which will hereinafter be explained. The wheels 122 are held against forward rotation by dogs 124 pivotally mounted on the shaft 125 supported by the side plates 118. Said dogs engage with the teeth on the wheels 122 as shown in Figs. 18 and 19, and in said dogs are formed slots 126 through which a shaft or rod 127 extends. A curved slot 128 is formed in each of the side plates 118, said slots being concentric with the shaft 125, upon which the dogs 124 are mounted. The rod or shaft 127 extends through the slots 126 and also through the slots 128, and said rod normally rests in the front ends of the slots 126 and in the rear ends of the slots 128, which will allow the dogs 124 sufficient free movement to release the wheels 122 without movement of the rod 127. This is necessary for the reason that when the racks 59 are moving backward they are in mesh with the wheels 122 and turn them backward, each wheel being thus set to represent the digit recorded by the corresponding rack and type-carrier. The rod 127 is supported by the arms 129, attached to the ends of the shaft 125 and affords means for drawing the dogs 124 out of engagement with the totalizer wheels, so that they can be turned back to normal position by the racks 59, and cause the latter to register the total represented therein.

130 indicates a rock shaft supported transversely below the key bars 3 and having two levers 131 attached thereto and connected by a rod 132. A link 133 connects one of the levers 131 with an arm 134 loosely mounted on the shaft 32. A collar 135 is on the shaft 32 and is provided with a shoulder 136 on its lower side, which when the shaft 32 is operated by the handle 33 engages with a pawl or dog 137 pivoted to the link 133 and held in position upon a pin or projection 138 by means of a spring. When the shoulder 136 engages with the dog 137 the link 133 will be pushed toward the rear and thereby rock the shaft 130, until the shoulder 136 passes over the dog 137, after which the parts moved thereby become stationary.

Mounted upon the shaft 130 is a series of carrying sectors 139, one for each of the wheels 122 in vertical alinement therewith, but disconnected except when the said wheels are lowered, in which event the wheels and sectors mesh. Each sector is connected by a link 140 with a sliding pawl or latch 141, which is supported in openings formed in the cross pieces 119 and 120. The pawls 141 correspond in number to the wheels 122 and the rear ends of said pawls are adjacent to these wheels and are provided with hooks or shoulders 142 against which the side teeth or lugs 123 rest when in idle position as shown in Fig. 9. The rear ends of these pawls are beveled off as shown so that when the wheels 122 turn and the teeth 123 are brought around against these pawls, the latter will be forced down. Each pawl 141 carries a stop 143 pivotally mounted and provided with a shoulder 144, which engages against the front side of the cross piece 120 to hold the pawl in position. The stops 143 have vertical projections on their front ends which are connected by the springs 144$^b$ to the cross piece 120, thereby holding the rear ends of the said stops and their pawls 141 by the lugs 144$^a$ up in position, as shown in Fig. 18, and also actuating the said pawls 141 rearwardly. The stops 143 are on the right hand sides of the pawls 141, and each stop carries a lateral projection 145 which projects under the next pawl 141 to the right so that if any pawl 141 be lowered to release its stop 143, the pawl which is so operated will also release the stop 143 on the next pawl to the left, by pushing down the projection 145 which moves the said stop downward in opposition to its spring 144$^b$. When any stop is thus released, the pawl 141 carrying said stop, is drawn to the rear by the spring 144$^b$, said pawl sliding in its supports and assuming the position shown in Fig. 19. Each pawl will be operated once during each rotation of its totalizing wheel 122, the lateral tooth or lug 123 passing onto the rear end of said pawl and depressing the same as shown by dotted lines in Fig. 18. The said pawl is lowered enough to release its stops 143 from the cross piece 120, and allow said pawl to be drawn rearwardly by the spring 144$^b$. As stated above, this operation of one pawl by its wheel 122 also releases the next pawl to the left, but the latter will not release its neighbor to the left for the reason that the stop 143 only is lowered and hence the next stop is not disturbed, it being necessary for the adjacent pawl 141 at the right to be positively lowered before such operation will take place. If, however, the carrying is to be done in two or more numerical orders consecutively, the same result will follow as when carrying in one numerical order only, by virtue of the position of the carrying teeth in the numerical orders in which the carrying is to take place. When carrying is to take place in any combination of numerical orders, the position of said carrying teeth will be the same as shown in Fig. 18, so that when the pawls 141 are released as heretofore described, and move rearward, they will come in contact with said teeth consecutively and be depressed thereby, the same as if said teeth were carried forward by the rotation of the wheels. This consecutive movement of the pawls 141 rearward results from their being automatically released in the manner described and will be continuous in the series until a carrying wheel is reached in which its carrying tooth is not in position to cause the downward movement of its pawl when drawn rearward. When any pawl 141 is released from restraint by the stop 143, it moves to the rear until a shoulder 146 formed on said pawl, engages with the cross piece 120. As described, each pawl 141 is connected with a corresponding carrying sector 139 by a link 140, and hence when a pawl 141 is released and is moved by its spring 144$^b$, the corresponding carrying sector 139 will be operated, and will be moved one tooth or digit, as shown in Fig. 19, the dotted lines indicating the normal position of this sector and the solid lines the position after operation by the sliding pawl. Each sector 139 is provided with a depending arm 139$^a$, which arms project below the rod 132 at its rear side so that when said rod is carried rearwardly by the movement of the link 133, the said sectors 139 will all be restored to their normal position. However, the rod 132 does not engage with the arms 139$^a$ until after the wheels 122 have been lowered into mesh with the carrying sectors, in order that said wheels may be advanced to complete the carrying. This operation is repeated every time a wheel 122 completes a rotation, rendering it necessary to advance its neighbor at the left. After the carrying sectors have been set by the operation of the pawls 141 as described, it is necessary that they be restored to their normal or idle position and also that the wheel 122 be lowered into mesh therewith and disconnected from the gear sectors 59. As stated the frame carrying the totalizing wheels 122 is supported by the T-lever 42 pivotally mounted on the shaft 44 (see Fig. 15). To the lower arm of said lever is connected a bar 147 which extends forwardly and is bifurcated at its front end and the two arms receive the shaft 32, being held against lateral movement by means of set collars. Said bar, however, is capable of longitudinal movement and when so moved it oscillates the T-lever 42 to raise or lower alternately the two frames carried thereby. A spring 148 draws said bar forward and thereby normally holds the wheels 122 in mesh with the gear sectors 59. However, when the main shaft 32 is rocked by the lever 33 to release the sectors 59, this bar is moved to the rear in opposition to the spring 148 by a cam 149, rigidly attached to the said shaft 32. A three-arm lever 150 is pivotally carried by the bar 147, said lever being held by a spring 151 connecting the same with the bar 147 and holding a pin 152 rigid with said lever upon the bar 147. To the upper arm of the lever 150 is connected a link 153, having a slot 154 in its opposite end to receive the end of the rod 127 which projects beyond the arm 129. The rod 127 is normally in the outer end of the slot 154 so that when the lever 150 is operated to draw the link 153 forwardly, the rod 127 will also be drawn forward as will the dogs 124 thereby releasing the wheels 122 and allowing them to turn forward while the racks 59 and type-carriers 60 advance to record the total represented in said wheels, which will be stopped at normal position by the teeth 123 engaging against the front sides of the hooks 142, thereby enabling said type-carriers to record the total. When it is desired to record the total, the total key 155 is depressed and the lower end of said key is pivoted to a bell crank 156 supported by a standard 157 and connected to an arm 158 on the shaft 117 by a rod 159. The lower end of the arm 158 is adjacent to a projection 160 on the lever 150 and when the total key is thus operated the arm 158 will be drawn forward and will engage with the projection 160 and thereby operate the lever 150 and the link 153, which by the rod 127 will release the dogs 124 from the wheels 122 and allow the latter to be turned forward.

One arm of the lever 150 is in the path of the travel of the cam 149, and when said cam engages therewith, the bar 147 will be moved to the rear and operate the lever 42 and lower the totalizing wheels to the sectors 139 and raise the frame carrying the digit stop wheels 38 which are normally at one side of the racks 59 and type-carriers 60. This allows the machine to be cleared of all numbers and all parts to be restored to idle position for the racks and type-carriers can then return to position without operating any of the wheels 122. In Fig. 15 the cam 149 is shown forcing the bar 147 rearwardly by means of the lever 150, and this operation places the wheels 38 in mesh with the racks 59 if they have moved to position, and lowers the total wheels 122 into mesh with the sectors 139 as shown.

Before a total can be taken it is necessary to release the dogs 124 from the wheels 122 so that the latter can turn on the forward movement of the racks 59 and be stopped in their normal position by the hooks 142 on the pawls 141 and thereby cause the racks and type-carriers to register and record the figures represented by the various wheels which is the total. To leave said wheels 122 in mesh with the racks 59 it is necessary to operate the lever 150 to move its arm out of the path of travel of the cam 149, so that the latter can move without operating the T-lever 42 to lower said wheels 122. This is accomplished by depressing the total key 155, which, as above described, operates the arm 158 and thereby the lever 150. Then when the shaft 32 is turned the cam 149 will not push the bar 147 rearwardly, but will leave the wheels 122 in mesh with the racks 59, and the said racks will be stopped in correct position to print the total by the hooks 142 as described.

The frame which carries the stop wheels 38 is restored to position at the right after each operation by means of the lever 161 pivoted to the base of the machine near the main shaft 32, and having its rear end engaged with a hook 162 on the end of the movable rod 48. (See Fig. 10.) The front end of said lever carries a roller 163, and upon the shaft 32 is loosely mounted a cam wheel 164, having a series of projections on its inner face which are adapted to operate against the wheel 163 and thereby operate the lever 161 which will move the rod 48 and parts connected thereto back to idle position. However, when the shaft 32 is at rest the roller 163 on the lever 161 is between the projections on the cam wheel and hence the rear end of the lever can move to the left with the rod 48. The cam wheel 164 is controlled by a pawl 165 and ratchet 166, the latter rigid with the shaft 32 so that when said shaft returns to position after operation the cam wheel 164 will be turned also, to operate the lever 161.

Having described the adding department of the machine and traced its operation, I will now describe the writing department and explain how the two departments can be used together or separately as desired. There is about the usual number of keys 167 in this department and the bars of these keys are located at the sides of the adding department, one half at each side. Said bars are pivoted at the rear of the machine upon a shaft 168 and are operated by being struck in the usual way. The type bars 169 are preferably U-shaped, as shown, and are arranged side by side being pivoted upon independent rods 170 mounted vertically so as to hold the type bars horizontally in front of the platen 81, said rods being supported in the frames 171. (See Fig. 6.) Each type bar preferably carries three characters, made to strike centrally on the platen by raising and lowering the latter. These type bars are of known construction and require no detailed description. The lower arm of each type bar has a projection 172 which will throw the type bars inward when drawn to the rear and strike the type against the ink ribbon or platen. Each type bar is controlled by a key and to the projections 172 are connected links 173, said links extending to the rear and being connected to the vertical levers 174 mounted vertically and having their lower ends pivoted near the base of the machine. There is one lever 174 for each key bar and each lever is provided with an arm 175 extending alongside of the corresponding key bar and having a projection 176 extending under the lower edge of the key bar so that when the latter is depressed the lever 174 will be moved to the rear, which in turn, by means of the connections above described, will strike the type bars against the platen or ribbon. Said levers 174 are restored to normal positions by springs 177 interposed between them and a cross piece 178.

The platen 81 is controlled by an escapement consisting of a rack 179 and two arms 180 and 181. (See Fig. 9.) The arm 181 is rigid upon a rock shaft 182, and the arm 180 is pivoted to said arm 181, but said arms are held apart normally a distance equal to one tooth on the rack 179. The arm 180 is normally in engagement with the rack 179, but by rocking the shaft 182 the arm 181 will be engaged with said rack and the arm 180 released and will then be thrown to the left one tooth. When the arm 180 is again engaged with the rack 179, the platen 81 will be drawn one step to the right, by the spring motor 183 of usual construction. To rock the shaft 182 I provide two levers 184 rigidly connected with said shaft and carrying a transverse rod 185 on their lower ends, said rod bearing against the rear edges of the levers 174, so that the latter will operate the escapement every time a writing key is struck, the movement of the platen occurring just after the key is released. The levers 184 also raise the ribbon guides 89 to carry the ribbon 88 against the paper on the platen, by pushing the arms 186 against the shoulders 187 on the lower sides of the guides 89 near the shaft 90. This operation is simultaneous with the movement of the key and before the type bar strikes the platen. The platen is raised and lowered by means of two keys provided for that purpose. The key bar 188 is rigid with the shaft 4, which is a rock shaft and has two levers 189 rigidly connected thereto one at each end. To each lever 189 is pivoted a horizontal arm 190 extending rearwardly and having a projection 191 integral with its under side, resting upon a roller 192 supported by the frame of the machine. There are two rollers 192, one for each of the arms 190. The key bar 193 is rigid with a sleeve 194 loose upon the shaft 4, and an arm 195 is attached to each end of the sleeve 194, so that the operation of the key bar 193 will also operate the arms 195. An arm 196 is pivoted to each arm 195 and said arms are parallel with the arms 190, and are provided at their rear ends with elevations 197 which carry the grooved pulleys 198, the latter riding upon the upper sides of the arms 190. The support which upholds the platen is carried by two upright standards 199 just inside of the arms 196 and having rollers 200 attached thereto which bear upon said arms 196, thereby upholding the platen frame. By operating the key bar 188 the arms 190 will be drawn forward and the projections 191 will descend from the rollers 192 and thereby lower the platen and frame by allowing the arms 196 to lower. Then the platen is in position to be struck by the lowest type on the U-shaped type bars, but by operating the key bars 193 the arms 196 will be drawn forward and the shoulder 197 will pass under the rollers 200, and thereby raise the platen and frame to be struck by the upper type on the type bars.

201 indicates the shift lever pivoted to the shaft 202 and connected at its rear end to a link 203, the latter having its upper end pivoted to the bell crank 204 supported by the frame of the machine. Said bell crank has its upper arms just in front of the rod 185 so that by depressing the forward end of the lever 201 the bell crank 204 will be operated to operate the levers 184 and through them, the escapement controlling the platen, the operation of which is described above.

It is thus seen that I have combined in an integral machine, a writing and adding department, either of which can be used at any time, or both can be used to write upon a single sheet of paper, and the operation of one department in no way interferes with the other. Wide commercial sheets of paper, checks, bills of lading, and such other papers used in commerce and trade, can be readily inserted and written upon by either or both departments, the written records identifying or otherwise referring to the arithmetical records as preferred. The machine is compact and narrow, and occupies about the space of an ordinary typewriter, and is no larger by having the two departments combined in one.

I claim:

1. In an adding machine, a series of type carriers, a series of hammers, latches holding said hammers, racks associated with said type carriers, adding mechanism, a series of laterally movable stops, lateral movement of which is necessary before said type carriers may be operated, a rotary member for setting said stops, keys for causing said rotary member to set said stops successively, means for operating said type carriers after said stops have been set, and means for releasing one hammer for each type carrier operated while the remaining hammers remain latched, substantially as specified.

2. In an adding machine, a series of type carriers, a hammer for each type carrier, latches holding said hammers, a series of laterally movable wheels whose operation is necessary before said type carriers and hammers may be operated, means for operating said type carriers after said wheels have been moved laterally, and means for releasing one hammer for each type carrier operated while the remaining hammers remain latched, substantially as specified.

3. In an adding machine, a series of laterally-movable digit stops, and a single movable member for operating said stops one at a time independently of each other, in combination with movable type-carriers, and means for entraining the type-carriers and digit stops so that the type-carriers will indicate the numbers represented by the digit stops, substantially as specified.

4. The combination with laterally movable wheels, keys, and mechanism controlled by said keys for setting said wheels to represent numbers, of recording mechanism operable to record said numbers and restore said wheels to idle position, adding mechanism controlled by said recording mechanism, and means for causing said adding wheels to control said recording mechanism whereby the total represented in said adding mechanism may be recorded, substantially as specified.

5. In an adding machine, type-carriers, mechanism for moving said type-carriers, a series of digit stops normally disconnected from the type-carriers, a single member for operating all of said digit stops one at a time, and means for moving said stops to connect with the type-carriers so that said type-carriers will record the numbers represented by said digit stops, substantially as specified.

6. In an adding machine, the combination of type-carriers, a series of digit stops, a single key-controlled member for operating said stops one at a time, means for entraining the digit stops with the type-carriers, and mechanism for operating the type-carriers to record the number represented by the digit stops, substantially as specified.

7. In an adding machine, rotary digit stops, a single rotary member operable to operate said digit stops one at a time to represent digits, type-carriers, devices operable to entrain the digit stops and the type-carriers, and mechanism for accumulating the number represented by the digit stops and at the same time returning said digit stops to idle position, substantially as specified.

8. The combination with laterally movable wheels, keys, and mechanism controlled by said keys to set said wheels to represent numbers, of recording mechanism operable to record said numbers and to restore said wheels to idle position, adding mechanism operated by said recording mechanism to add the numbers recorded, means for transferring from lower to higher orders in said adding mechanism in the process of addition, and means for coöperating said adding and recording mechanisms to record any total contained in said adding mechanism, substantially as specified.

9. The combination with laterally movable wheels, a wheel for setting said laterally movable wheels to represent numbers, and keys for causing said setting wheel to operate, of recording mechanism operable to record said numbers and restore said laterally movable wheels to idle position, adding mechanism operated by said recording mechanism to add the numbers recorded, and means for coöperating said adding and recording mechanisms to record any total contained in said adding mechanism, substantially as specified.

10. In an adding machine, arcuate type-carriers, type supported by said type-carriers, said type-carriers being movable toward a common center, and mechanism for operating said type-carriers to record numbers, in combination with rotary key-controlled stops effective to limit movement of said type-carriers, substantially as specified.

11. In an adding machine, sectors, type carried by said sectors and having their printing ends inside the arcs of the sectors, a platen, mechanism for moving said sectors effectively to position said type adjacent to said platen, wheels, keys controlling said wheels, mechanism for entraining said wheels with said sectors, means whereby said wheels will stop said sectors when the desired type are adjacent to said platen and mechanism operable to add numbers when said sectors are operated, substantially as specified.

12. In an adding machine, type-carriers, gear sectors controlling said type-carriers, rotary digit stops to limit movement of the gear sectors and thereby the type-carriers, and mechanism for operating said gear sectors and type-carriers to record numbers, substantially as specified.

13. In an adding machine, arcuate type-carriers, means for moving them, rotary stop devices controlling the type-carriers, keys operable to adjust said stop devices, a platen within the arc of the type-carriers, and devices for striking the type against the platen, substantially as specified.

14. A writing and adding machine having a single platen, means for shifting said platen laterally, means for raising and lowering said platen, type-bars in front of said platen, type-carriers below said platen, rotary stops for said type-carriers, keys controlling said stops, mechanism for operating said type-carriers effectively to record numbers on said platen after said keys have been operated, adding mechanism operable automatically to add the numbers recorded, and means holding said platen stationary during adding operations, substantially as specified.

15. In an adding machine, the combination of type-carriers, rotary stops limiting movement of said type-carriers, keys and intermediate devices for setting the said stops, devices for moving the stops transversely to the required position, printing hammers, and devices for operating, said hammers when the type-carriers are operated, substantially as specified.

16. In an adding machine, type-carrying sectors, racks controlling said sectors, key-controlled rotary stops limiting movement of said racks and sectors, mechanism for operating said racks and sectors for the purpose of recording numbers, and adding wheels operable to add the numbers recorded, substantially as specified.

17. In an adding machine, type-carriers, an oscillating support, adding mechanism and a series of digit stops supported by said support, and mechanism for oscillating said frame effectively to bring the stops and adding mechanism alternately into connection with the type-carriers, substantially as specified.

18. In an adding and writing machine, a platen, recording mechanism operable to record any desired words on said platen, type-carriers independent of said recording mechanism, means for moving said type-carriers toward said platen, rotary stops to limit movement of the type-carriers when so moved, adding wheels, hammers, means for operating said hammers after the type-carriers have been positioned, to drive the type against said platen, substantially as specified.

19. A writing and adding machine comprising type-bars operable to record words, type-carriers for recording numbers, rotary key-controlled stops for said type-carriers, keys for adjusting said stops and a single paper carriage arranged to feed paper to said type-bars and said type-carriers, substantially as specified.

20. In an adding machine, type-carrying members, racks controlling said type-carrying members, rotary stops arranged to limit movement of said racks and type-carrying members, adding mechanism, and means for entraining said adding mechanism with said racks, substantially as specified.

21. In an adding machine, type-carriers, racks controlling said type-carriers, a series of laterally movable devices adjustable to limit movement of said type-carriers, keys controlling said laterally movable devices, adding wheels, carrying devices for said adding wheels, means for causing said adding wheels to operate when said racks are moved, and means for operating said carrying devices, substantially as specified.

22. In an adding and writing machine, a platen, type-bars located in front of said platen, type-sectors movable in front of said platen, key-controlled wheels limiting movement of said sectors, adding mechanism operable by said sectors, devices holding said platen stationary when said sectors are operated, and devices for moving said platen vertically to receive impressions from different type on said type-bars, substantially as specified.

23. In an adding machine, type-carrying sectors, gear sectors controlling them, digit stops for the sectors, adding wheels, and means for entraining the digit stops and adding wheels alternately with the gear sectors, substantially as specified.

24. In an adding machine, type-sectors, gear sectors controlling said type-sectors, mechanism for operating said sectors, laterally-movable stop devices limiting movement of said sectors, adding mechanism, means for operating said adding mechanism when said gear sectors operate, and carrying devices operable to carry or transfer from lower to higher orders in said adding mechanism, said carrying devices being separate from said gear sectors, substantially as specified.

25. In an adding machine, recording mechanism, an oscillating support, adding wheels and stop wheels carried in said support, and mechanism for connecting said adding wheels and said stop wheels alternately with said recording mechanism, substantially as specified.

26. A machine comprising a writing department, and an adding department with separate type, a series of laterally-movable wheels controlling said adding department, a single platen for both departments, and means for writing by both departments upon the front of the platen midway of the sides of the machine, the records so produced being visible to the operator as written, substantially as specified.

27. In an adding machine, a platen, type-carriers, type carried by said type-carriers, mechanism operable to move said type-carriers to position said type adjacent to said platen, key-controlled rotary stops effective to limit the movement of said type-carriers to position any desired type adjacent to said platen, and hammers operable to drive said type to print after said type-carriers have been positioned by said stops, substantially as specified.

28. In an adding machine, sectors having uniform and variable movement, type carried by certain of said sectors, and having their type ends inside the arcs of the sectors, means for operating said sectors, key-controlled rotary stops operable to engage with and stop movement of said sectors, and devices for driving said type to print after said sectors have been stopped by said stops, substantially as specified.

29. In an adding machine, a platen, type-carriers operable to record on said platen, printing hammers operable to drive the type on said type-carriers to record, a single stop effective to control the movement of each type-carrier irrespective of the distance which it moves, and adding wheels operable to add the numbers recorded by said type, substantially as specified.

30. In an adding machine, arcuate type-carriers carrying type movable inward to record, a single stop adjustable to control each type-carrier in each recording operation, a platen within the arcs of said type-carriers, and mechanism for operating said type-carriers and type effectively to cause said type to record on said platen, substantially as specified.

31. In an adding machine, devices carrying movable type, a single stop for each type-carrying device, a platen, hammers for driving the type against said platen, mechanism for moving said type-carrying devices toward said platen, mechanism for automatically returning said type-carrying devices to idle position after making a record, and adding mechanism operated by said devices, substantially as specified.

32. In an adding machine, arcuate type-carriers, racks connected with said type-carriers and having a certain movement independently of said type-carriers, rotary stops to stop movement of said racks and type-carriers in one direction, and adding wheels operated by said racks when said racks move in the direction opposite from the direction in which they move when said stops limit their movement, substantially as specified.

33. In an adding machine, movable type-carrying sectors, a platen within the arc of said sectors, laterally-movable wheels adjustable to limit movement of said sectors, and mechanism for operating said sectors effectively to cause the type carried thereon to record on said platen, substantially as specified.

34. In an adding machine, the combination of a platen arranged to carry paper, type-carriers movable in front of said platen, a rotary member effective to stop each type-carrier in position to record, adding mechanism controlled by said type-carriers, and devices controlled by the type-carriers for printing when the said type-carriers are moved in front of said platen, substantially as specified.

35. In an adding machine, sectors carrying type which are movable inwardly to record, a platen within the arc of the said sectors, a single stop for controlling the movement of each sector, keys for setting said stop preliminary to operation of said sectors, and mechanism for causing the type on said sectors to record after said sectors have been moved toward said platen, substantially as specified.

36. An adding machine comprising type-carriers, a series of key-controlled rotary stop wheels to govern said type-carriers, adding wheels, racks connected with said type-carriers, and mechanism whereby said stop wheels and said adding wheels will be connected alternately with the said racks, the former when an item is being printed and the latter immediately thereafter and before reverse movement of the said racks occurs, substantially as specified.

37. In an adding machine, type-carrying sectors, gear attachments for said type-carrying sectors, rotary stops controlling movement of said sectors and gear attachments, adding wheels operated by the gear attachments, and printing hammers controlled by the sectors to strike the type, substantially as specified.

38. In an adding machine, gear parts, type-carrying sectors having uniform and variable movement, rotary stops, keys controlling said stops preliminary to operation of said sectors, a platen, and printing hammers automatically controlled by said sectors, substantially as specified.

39. In an adding machine, gear sectors, gear stops controlling said sectors, means for setting said stops preliminary to operating said sectors, type-carrying sectors connected with said gear sectors and being movable relatively to said gear sectors, a platen, and means for operating said sectors as required to record on said platen, substantially as specified.

40. In an adding machine, a platen, type-carriers movable toward said platen, rotary stops controlling the type-carriers, mechanism for adjusting said stops before operating said type-carriers, and hammers operable to drive the type to print on said platen at the proper time when said type-carriers are operated, substantially as specified.

41. An adding machine having a platen, type-carrying sectors, a rotary stop for each sector, a key-controlled member operable to set all of said stops, means for moving said sectors to record on said platen, and printing hammers whose operation is controlled by said sectors, substantially as specified.

42. In an adding and writing machine, the combination of a platen, a group of type-bars mounted near each side of the machine, and mechanism for operating said type-bars to record on said platen, in combination with type-carrying parts supported below the platen midway of the sides of the machine, rotary stops, mechanism operable to set said stops, and mechanism for operating said type-carrying parts to the front of the platen between said groups of type-bars after said stops have been set, substantially as specified.

43. In an adding machine, type-carrying sectors, independently operable rotary stops for said sectors, mechanism for setting said stops, and mechanism for operating said sectors to record and simultaneously connecting said stops therewith, substantially as specified.

44. In an adding machine, the combination of type-carriers, a series of independently operable rotary stops for said type-carriers, mechanism for operating said stops, and mechanism for entraining said stops and type-carriers to record numbers, substantially as specified.

45. In an adding and writing machine, type-carriers, a series of rotary stops therefor, means for setting said stops to represent numbers, devices entraining said stops and said type-carriers to limit throw of said type-carriers, devices operable to record numbers when said type-carriers stop, and adding mechanism operable to add said numbers, in combination with typewriting mechanism operable to record any desired words in any desired relation to the numbers, substantially as specified.

46. In an adding machine, the combination of type-carriers, rotary stops, keys operable to set said stops, controlling devices intermediate said stops and said type-carriers, adding wheels, and mechanism for entraining said stops and said adding wheels with said controlling devices at different times, substantially as specified.

47. In an adding machine, type-carriers, mechanism for operating them, rotary stops, devices for operating said stops to stop movement of said type-carriers, a platen arranged to carry paper, and hammers for driving the type to print on paper carried by said platen when said type-carriers stop, substantially as specified.

48. In an adding machine, wheels, keys, mechanism for setting said wheels to represent numbers when said keys are operated, a platen arranged to hold paper, type-carriers, devices for operating said type-carriers coördinately with the wheels to present type indicating the number represented by said wheels adjacent to the printing line of said platen, and hammers operable to drive the type to record after the type-carriers operate, substantially as specified.

49. In an adding machine arcuate type-carriers, a stop adjustable to stop said type-carriers in any desired position, type carried by said type-carriers and having their printing ends within the arc of said type-carriers, a platen within the arc of said type-carriers, hammers, and means for causing said hammers to strike the type when said type-carriers are operated, substantially as specified.

50. In an adding machine, a platen, type-carrying sectors, mechanism for moving said sectors partially around said platen, wheels adjustable to stop the sectors as required, printing hammers automatically thrown against the type when said sectors stop, and a totalizer operated by the movement of the sectors, substantially as specified.

51. In an adding machine spring-actuated racks and type-carrying sectors, rotary stops limiting their movement, printing hammers for striking the type, and adding wheels operable to add the numbers recorded, substantially as specified.

52. In an adding and writing machine, adding and writing keys arranged in a single key-board, in combination with type-bars actuated by the writing keys, type-carrying sectors operable to record the numbers struck on the adding keys, rotary stops to limit movement of said sectors, means for adjusting said stops, a single platen arranged to feed paper to said type-bars and to said sectors, and ribbon guides movable to and from the record line of said platen when said type-bars and said sectors are operated, substantially as specified.

53. In an adding machine, key-controlled rotary stops, type-carrying sectors, gear sectors connected to said type-carrying sectors and having both variable and uniform movement and being controlled by said stops, printing hammers for the type, and adding wheels operated by said gear sectors, substantially as specified.

54. The combination with word printing mechanism employing a platen, of type-carriers separate from the word printing mechanism, devices for operating the type-carriers to record on the platen, a single stop member for each type-carrier, and mechanism for adjusting the stops to limit movement of their respective type-carriers as required to record any desired number on the platen, substantially as specified.

55. The combination with type-carriers, means for moving them to record numbers, wheels adjustable to stop movement of the type-carriers, adding wheels operable to add the numbers recorded, and means for moving the first-named wheels and the adding wheels as required to perform the aforesaid functions, substantially as specified.

56. The combination in an adding machine, of type-carriers, a platen, devices for operating the type-carriers adjacent to said platen, hammers for driving the type against said platen, and an adjustable stop for limiting movement of each type-carrier irrespective of the distance which it moves in their recording position, substantially as specified.

57. An adding and writing machine comprising a platen, devices for recording any desired words on the front of said platen, type-carriers for the adding department movable to the front of the platen to produce arithmetical records thereon, and a stop for each type-carrier, said stops being adjustable to control the type-carrier irrespective of the required movement of the latter to record a number, substantially as specified.

58. In an adding machine, a platen, type-carriers, type carried by said type-carriers, mechanism including laterally-movable stop devices operable to position said type in any desired relation to said platen, hammers operable to drive said type to record after said type have been positioned, adding wheels operable to add the numbers recorded, and transfer devices disconnected from said type-carriers operable to effect carrying in said adding wheels.

59. In an adding machine, the combination with a series of type-carriers operable to record numbers, laterally-movable stops adjustable to limit movement of said type-carriers, of adding wheels, gear parts operated with the type-carriers effectively to operate the adding wheels, and transfer devices separate from said gear parts operable to effect carrying between said adding wheels.

60. In an adding machine, type-carriers, a single stop for each of said type-carriers, devices for setting each stop independently of the remaining stops, and means for entraining said stops and said type-carriers, substantially as specified.

61. In an adding machine, recording mechanism, a lever, connections from said lever controlling the recording mechanism, stops to limit movement of the recording mechanism, adding mechanism operable by the recording mechanism, and means for entraining said stops and said adding mechanism alternately with said recording mechanism, substantially as specified.

62. In an adding machine, recording mechanism, adding mechanism, stops to limit movement of the recording mechanism, and a movable member operable to connect the stops and adding mechanism alternately with the recording mechanism, substantially as specified.

63. In an adding machine, the combination with type-carriers, movable type on said type-carriers, racks in connection with said type-carriers, and a platen, of means for moving said type-carriers toward said platen, key-controlled wheels operable to limit movement of the type-carriers when so moved, hammers for driving the type against the platen, and adding wheels operated by said racks, substantially as specified.

64. In an adding machine, recording devices, stops for said recording devices, adding wheels, devices for moving said stops and adding wheels into connection with said recording devices alternately, and transfer devices separate from said recording devices to effect carrying from lower to higher orders in said adding wheels, substantially as specified.

65. An adding machine comprising type-carriers, type loosely mounted on said type-carriers, laterally movable devices whose operation is necessary before said type-carriers may be operated, hammers, latches holding said hammers, mechanism for operating said type-carriers to record numbers, adding wheels operable to add the numbers recorded, transfer devices detached from said type-carriers and acting on said adding wheels to transfer from lower to higher orders in the process of addition, and means for releasing one hammer for each type-carrier operated while the remaining hammers remained latched, substantially as specified.

66. In an adding machine, type-carriers, laterally-movable rotary members limiting the movement of said type-carriers, and mechanism operable to adjust said rotary members into operative position prior to the operation of said type-carriers, substantially as specified.

67. In an adding machine, type-carriers, type loosely supported on said type-carriers, a printing hammer for each type-carrier, latches holding said printing hammers, a laterally movable device whose operation is necessary before said type-carriers and hammers may be operated, means for moving said laterally movable device, order to order from lower to higher orders, mechanism for operating a number of type-carriers and hammers equal to the number of orders to which said laterally movable device has moved while the remaining hammers remain latched, and means for restoring the hammers and type-carriers so operated to idle position while the remaining hammers remain latched, substantially as specified.

68. In an adding machine, recording mechanism, means for operating said mechanism to record numbers, rotary stops adjustable to limit movement of said recording mechanism, mechanism for adjusting said stops independently of each other, and adding wheels operated by said recording mechanism, substantially as specified.

69. An adding and writing machine comprising mechanism operable to write any desired words, a platen, type-carriers located under said platen mechanism for moving said type-carriers to the front of said platen, stops adjustable to limit movement of said type-carriers, and a member operable to set any of said stops, substantially as specified.

70. In an adding machine, the combination with a series of type-carriers, gear parts connected to said type-carriers, and laterally-movable mechanism controlling said type-carriers and gear parts, of adding wheels, means for moving said adding wheels into engagement with said gear parts, transfer devices separate from said gear pears, and means for causing said transfer devices to effect carrying between said adding wheels, substantially as specified.

71. In an adding and writing machine, recording mechanism, stops to limit movement thereof, adding wheels, and mechanism for entraining the stops and adding wheels alternately with the recording mechanism, determinable by the direction of movement of said recording mechanism, substantially as specified.

72. In an adding machine, recording mechanism, devices for operating said mechanism to record numbers, and a series of laterally-movable and independently rotatable stops to limit movement of said recording mechanism, substantially as specified.

73. In an adding and writing machine, type-carriers, a platen, mechanism for moving said type-carriers toward said platen, key-controlled rotary stops limiting movement of said type-carriers, hammers operable to drive the type to record on said platen, and mechanism supported adjacent to said platen operable to record any desired words thereon, substantially as specified.

74. In an adding and writing machine, a platen, type-carriers operable to record numbers on said platen, rotary controllers to limit movement of said type-carriers, adding mechanism operable to add the numbers recorded, type-bars separate from said type-carriers, and keys for operating said type-bars to record words on said platen, substantially as specified.

75. In an adding machine, the combination with a platen, type-carriers, gear parts connected with said type-carriers, means for operating said type-carriers toward said platen, laterally movable stops limiting movement of said type-carriers, and hammers for driving the type to print, of adding wheels, means for entraining said adding wheels with said gear parts after each printing operation and before return movement of said gear parts begins, and transfer devices, separate from said gear parts, substantially as specified.

76. In an adding machine, the combination with a series of type-carriers, gear parts, pin-and-slot connections between said type-carriers and gear parts, and means for operating said type-carriers and gear parts to record numbers, of key-controlled rotary stops adjustable to limit movement of said type-carriers and gear parts, adding wheels operated by said gear parts, and transfer devices separate from said gear parts operative to effect carrying between said adding wheels, substantially as specified.

77. The combination with a series of type-carriers, gear parts connected thereto means for operating the type-carriers and gear parts to record numbers, keys, stops separate from said keys and controlled thereby to limit movement of said type-carriers and gear parts, and a set of transfer devices separate from said gear parts, of adding wheels, means for holding said adding wheels in connection with said gear parts during return movement of the latter, and means for moving said adding wheels into engagement with said transfer devices after the gear parts stop, substantially as specified.

78. In an adding machine, a series of type-carriers, type on said carriers, a series of hammers operable to drive said type to record, a series of wheels whose operation is necessary before said type-carriers and hammers may be operated, keys whereby said wheels may be set to represent numbers, and mechanism for operating said type-carriers and hammers to record said numbers.

79. In an adding machine, a series of type-carriers, type on said carriers, a series of hammers operable to drive said type to record, a platen arranged to feed paper to said type-carriers, a series of wheels whose operation is necessary before said type-carriers and hammers may be operated, keys whereby said wheels may be set to represent numbers, and mechanism for operating said type-carriers and hammers to record said numbers.

80. In an adding machine, a series of oscillatory type-carriers, a series of laterally movable wheels, means operable to set said wheels to represent numbers, and mechanism for causing said type-carriers to record the numbers represented by said wheels, substantially as specified.

81. In an adding machine, recording mechanism, rotary stops controlling the recording mechanism, and adding wheels independent of the rotary stops operated by said recording mechanism, substantially as specified.

82. In an adding machine, recording mechanism, means for operating said recording mechanism, rotary stops controlling said recording mechanism, adding wheels, and means for entraining the stops and adding wheels with said recording mechanism, substantially as specified.

83. In an adding machine, recording mechanism, rotary stops to limit movement of said recording mechanism when operated to record, and adding wheels operated by the recording mechanism when said mechanism is returning to idle position, substantially as specified.

84. In an adding machine, type-carriers, a single stop adjustable to control the movement of each type-carrier to record any one of the ten digits or figures, adding wheels, means for entraining said adding wheels with said type-carriers when said type-carriers are operated, and transfer devices operable independently of the type-carriers, substantially as specified.

85. In an adding machine, type-carriers, gear attachments, means for moving the type-carriers a certain distance prior to moving the gear attachments and then moving both together, stops to engage with and limit movement of the gear attachments and thereby the type-carriers, total wheels operated by the gear attachments, and carrying devices separate from the gear attachments, substantially as specified.

86. In an adding machine, recording mechanism, rotary stops to limit movement of said recording mechanism, means for moving said stops transversely to communicate with the recording mechanism, means for turning said stops independently of each other as required to limit movement of the recording mechanism, and adding mechanism controlled by said recording mechanism effectively to add numbers recorded by said recording mechanism, substantially as specified.

87. In an adding machine, a series of wheels, mechanism operable to set said wheels to represent numbers, adding wheels, a series of racks, and mechanism for operating said racks and entraining said first-named wheels and said adding wheels therewith effectively to cause said adding wheels to add the numbers represented by said first-named wheels, substantially as specified.

88. In an adding machine, the combination with a platen, and typewriting mechanism operable to print any desired words on said platen, of adding mechanism, printing devices for said adding mechanism operable to and from the platen to print in the same line with the typewriting mechanism, and gear wheels adjustable to control the said printing devices of the adding mechanism during the operation toward the platen to print.

89. In an adding machine, a series of type-carriers, mechanism operable to move said type-carriers in position to print laterally-movable devices limiting movement of said type-carriers, racks connected with said type-carriers, means for moving said racks and type-carriers to idle position after each printing operation, adding wheels, means for entraining said adding wheels with said racks prior to return movement of said racks, and transfer devices acting on said adding wheels to transfer or carry from lower to higher orders in the process of addition, substantially as specified.

90. In an adding machine, a platen arranged to hold paper, a series of type-carriers, a series of hammers operable to drive the type on said type-carriers to record on paper on said platen, a series of laterally-movable devices selectively settable to limit movement of said type-carriers and whose operation is necessary before said type-carriers may be operated, means for setting said devices to represent numbers, means for operating said type-carriers to record said numbers, adding wheels operated by said type-carriers, and toothed carrying elements coöperating with said adding wheels to carry or transfer from lower to higher orders in addition.

91. In an adding machine, a series of wheels, mechanism operable to set said wheels to represent numbers, a platen, mechanism operable to record on said platen the numbers represented by said wheels and to restore said wheels to idle position, and mechanism operable automatically to add each number after it has been recorded, substantially as specified.

92. In an adding machine, type-carriers, rotary stops to control said type-carriers, retaining devices holding said type-carriers in idle position, a lever operable to move said retaining devices and release said type-carriers therefrom, and means controlled by said lever to move said stops into entrained connection with said type-carriers, substantially as specified.

93. In an adding machine, recording mechanism, rotary stops limiting movement of said mechanism, adding wheels operated by said recording mechanism, a lever, and devices controlled by said lever for entraining the said stops and said adding wheels alternately with the recording mechanism, substantially as specified.

94. In an adding machine, a platen, type-carriers, devices holding said type-carriers in idle position, a lever for releasing said devices from said type-carriers, means for operating said type-carriers toward said platen, key-controlled wheels limiting movement of said type-carriers, and devices separate from said type-carriers for writing words on said platen, substantially as specified.

95. In an adding machine, type-carriers, stops to limit movement of said type-carriers, a key-controlled rotary member operable to set said stops to represent numbers, devices for entraining said stops with said type-carriers, and mechanism for operating said type-carriers to record the numbers represented by said stops, substantially as specified.

96. In an adding machine, recording mechanism, adding wheels, stops for the recording mechanism, a support for said wheels and said stops, and manually operable mechanism for entraining said wheels and said stops alternately with said recording mechanism, substantially as specified.

97. In an adding machine, type-carriers, rotary wheels limiting the movement of said type-carriers, a member operable to engage with said wheels one at a time to set them to represent numbers, and mechanism for moving the type-carriers to record and the numbers represented by said wheels, substantially as specified.

98. An adding machine having recording mechanism, and rotary stops individually movable to represent digits and collectively movable to engage with the recording mechanism prior to operation of said recording mechanism, substantially as specified.

99. In an adding machine, type-carriers, rotary stops individually movable to represent digits, devices operable to entrain the stops with the type-carriers, printing hammers, devices for operating the printing hammers to print numbers, and adding mechanism operable to add the numbers so printed, substantially as specified.

100. In an adding machine, type-carriers, adding wheels, gear attachments intermediate the adding wheels and type-carriers, stops to limit movement of the type-carriers in one direction, and a lever having connections whereby the adding wheels and stops may be alternately connected with the gear attachments, substantially as specified.

101. In an adding machine, a platen, mechanism operable to record numbers on said platen, rotary stops controlling said recording mechanism, keys operable to set said rotary stops to represent numbers to be recorded, adding wheels operated by said recording mechanism, and transfer devices acting on said adding wheels effectively to carry from lower to higher orders in the process of addition, substantially as specified.

102. In an adding machine, a platen arranged to hold paper, type-carriers, laterally-movable devices determining which of said type-carriers may be operated, hammers, mechanism for operating said type-carriers and said hammers effectively to record numbers on paper held by said platen, adding wheels, means to hold said adding wheels entrained with said type-carriers for adding purposes, and transfer devices separate from said type-carriers operable to effect carrying in said adding wheels.

103. In an adding machine, a platen, type-carriers, laterally-movable devices determining which of said type-carriers may be operated, hammers, means for driving said hammers against the type to record numbers, adding wheels, means for entraining said adding wheels and said type-carriers after each number is recorded, transfer devices, and means for holding said adding wheels entrained with said transfer devices during the time said type-carriers are moving to recording position.

104. In an adding machine, a platen, type-carriers operable to record on said platen, laterally-movable devices determining which of said type-carriers may be operated, hammers acting to drive the type on said type-carriers to print, gear parts connected to said type-carriers, adding wheels, transfer devices, and mechanism operable to hold said adding wheels entrained with said gear parts during movement of the latter in one direction and with said transfer devices during movement of said gear parts in the other direction, substantially as specified.

105. In an adding machine, a platen, type-carriers, hammers, adding wheels, and transfer devices, in combination with mechanism operable to move said type-carriers toward and from said platen, means for actuating said hammers to drive the type to print, and devices operable to move said adding wheels into entrained connection with said type-carriers after each number has been recorded and also to move said adding wheels into entrained connection with said transfer devices when said type-carriers move toward said platen, substantially as specified.

106. In an adding machine, a platen, type-carriers and hammers operable to record numbers on said platen, and laterally movable devices determining which of said type-carriers may be operated, in combination with adding wheels, transfer devices, and mechanism operable to hold said adding wheels entrained with said transfer devices while said type-carriers are moving toward said platen, and to move said adding wheels into entrained connection with said type-carriers and hold them in such relation while said type-carriers are moving toward idle position, substantially as specified.

107. In an adding machine, a platen, type-carriers, laterally-movable devices determining which of said type-carriers may be operated, type carried by said type-carriers, hammers, and mechanism for operating said type-carriers and hammers effectively to record numbers on said platen, in combination with adding wheels, transfer devices separate and disconnected from said type-carriers, and means for moving said adding wheels from entrained connection with said type-carriers to entrained connection with said transfer devices, substantially as specified.

108. In an adding machine, a series of wheels, mechanism operable to set said wheels to represent numbers and to move said wheels transversely in the machine, type-carriers, a platen, mechanism operable to entrain said wheels with said type-carriers, and mechanism operable to cause said type-carriers to record on the platen the number represented by said wheels when said wheels and said type-carriers are entrained.

109. In an adding machine, a series of wheels, means for setting said wheels to represent numbers, adding wheels, means for moving said first-named wheels laterally with respect to said adding wheels, and mechanism for causing said adding wheels to add the numbers represented by said first-named wheels.

110. In an adding machine, a series of wheels, mechanism operable to set said wheels to represent numbers and to move said wheels laterally, recording mechanism, and means for entraining said wheels with the recording mechanism and operating said recording mechanism and said wheels synchronously effectively to record the number represented by said wheels, and adding wheels separate from the first-named wheels operable to add the numbers recorded as aforesaid.

111. In an adding machine, a series of laterally-movable wheels, mechanism operable to set said wheels to represent numbers, and adding wheels separate from said laterally-movable wheels, in combination with recording mechanism operable at a single operation to record the number represented by said laterally-movable wheels and to cause said adding wheels to add said number.

112. In an adding machine, a series of laterally-movable wheels, keys, and mechanism whereby said wheels may be set to represent any number struck on said keys, in combination with a series of type-carriers, and mechanism for operating said type-carriers effectively to record the number represented by said wheels and to restore said wheels to idle position.

113. In an adding and writing machine, a series of wheels, means for adjusting said wheels to represent numbers, type-carriers, a platen arranged to hold paper, mechanism for operating the type-carriers to record the number represented by said wheels on the paper held by the platen, adding mechanism, and means for operating said adding mechanism after the number has been recorded, in combination with mechanism operable to perform typewriting work upon the paper held by the paper aforesaid, substantially as specified.

114. An adding and writing machine comprising a group of wheels, mechanism for introducing numbers into said wheels, mechanism operable to record the numbers introduced into said wheels, adding mechanism, and means for operating said adding mechanism after each number is recorded as required to add said number, in combination with typewriting mechanism operable to record on the same sheets of paper that the aforesaid numbers are recorded on, substantially as specified.

115. An adding and writing machine comprising a group of wheels, means operable to introduce or set up numbers in said wheels, a platen arranged to hold paper, mechanism operable to record the numbers introduced or set up in said wheels, adding wheels, and means to transfer the numbers from said first-named wheels to said adding wheels after said numbers have been recorded, respectively, in combination with typewriting mechanism operable to record on the paper held by the platen aforesaid, substantially as specified.

116. In an adding machine, a series of laterally-movable wheels, and mechanism operable to set said wheels to represent numbers, in combination with adding wheels, and racks operable in connection with said laterally-movable wheels and with said adding wheels effectively to cause said adding wheels to add the numbers represented by said laterally-movable wheels.

117. In an adding machine, a series of laterally-movable wheels, and mechanism operable to set said wheels to represent numbers, in combination with adding wheels, recording devices, and mechanism for operating said recording devices effectively to record the number represented by said laterally-movable wheels and at the same operation cause said adding wheels to add said number.

118. In an adding machine, a series of laterally-movable wheels, mechanism operable to set said wheels to represent numbers, in combination with a series of type-carriers movable side by side, and mechanism for operating said type-carriers and wheels effectively to record any number represented by said wheels at a single operation of the type-carriers, substantially as specified.

119. In an adding machine, a series of laterally-movable wheels, key-controlled mechanism operable to set said wheels to represent numbers, recording mechanism, means for entraining said recording mechanism and said wheels, and mechanism for operating said recording devices effectively to record any number represented by said wheels at a single operation.

120. The combination with a set of wheels, and mechanism operable to set said wheels to represent numbers, means for recording said numbers represented by said wheels, and adding wheels separate from said first-named wheels operable to add the numbers as they are recorded.

121. The combination with laterally-movable wheels, and mechanism operable to set said wheels to represent numbers, of recording mechanism operable to record said numbers and restore said wheels to idle position.

122. An adding and writing machine comprising words recording mechanism, type-carriers operable to record numbers, wheels, mechanism operable to adjust said wheels to represent numbers to be recorded by said type-carriers, and adding mechanism operable to add the numbers recorded.

123. A machine comprising words recording mechanism, type-carriers, wheels, mechanism for adjusting said wheels to represent numbers, prior to operating said type-carriers, mechanism operable to cause said type-carriers to record the numbers represented by said wheels, and a platen operable to feed paper to said recording mechanism and to said type-carriers.

124. A machine comprising words recording mechanism, type-carriers, stops for said type-carriers, a member operable to set any desired number of said stops to represent numbers, mechanism for operating said type-carriers effectively to record the numbers represented by said stops, and a paper feed device operable to feed paper to said recording mechanism and to said type-carriers.

125. A machine comprising words recording mechanism, type-carriers, stops for said type-carriers, a member operable to set any desired number of said stops to represent numbers, mechanism for operating said type-carriers to record the numbers represented by said stops and a paper carriage feeding paper to said recording mechanism and to said type-carriers, and adding mechanism operated to add the numbers recorded.

126. An adding and writing machine comprising a platen, typewriting mechanism operable to record any desired words on said platen, type-carriers separate from said typewriting mechanism, mechanism for operating said type-carriers to record numbers, adding wheels, transfer devices for said adding wheels disconnected from said type-carriers, means for entraining said adding wheels with said type-carriers and holding them so entrained during movement of said type-carriers in one direction, and means for moving said adding wheels from entrained connection with said type-carriers to entrained connection with said transfer devices, substantially as specified.

127. An adding and writing machine comprising a platen, typewriting mechanism operable to record any desired words on paper on said platen, type-carriers separate from said typewriting mechanism, keys, stops detached from said keys to limit movement of said type-carriers, mechanism for operating said type-carriers to record numbers, adding wheels, transfer devices for said adding wheels disconnected from said type-carriers, means for entraining said adding wheels with said type-carriers and holding them so entrained during movement of said type-carriers in one direction, and means for moving said adding wheels from connection with said type-carriers to entrained connection with said transfer devices, substantially as specified.

128. An adding and writing machine comprising a platen, typewriting mechanism operable to record any desired words on paper on said platen, type-carriers separate from said typewriting mechanism, laterally-movable devices operable to limit movement of said type-carriers, mechanism for operating said type-carriers to record numbers, adding wheels operated to add the numbers recorded by said type-carriers, transfer devices for said adding wheels, and means for moving said adding wheels into connection with said transfer devices, substantially as specified.

129. An adding machine comprising type-carriers, movable type on said type-carriers, hammers, paper feed devices, mechanism for moving said type-carriers to recording position, means for operating said hammers effectively to drive said type to record, adding wheels, racks loosely connected with said type-carriers operating said adding wheels, and transfer devices separate from said racks acting on said adding wheels effectively to transfer from lower to higher orders in the process of addition.

130. An adding machine comprising type-carriers, type on said type-carriers, laterally-movable devices whose operation is necessary before said type-carriers may be operated, hammers, mechanism for operating said type-carriers and hammers to record numbers, adding wheels, racks operating said adding wheels to add the numbers recorded, and transfer devices separate from said racks acting on said adding wheels effectively to transfer from lower to higher orders in the process of addition.

131. An adding machine comprising type-carriers, movable type on said type-carriers, hammers, paper feed devices, laterally movable selectors whose operation is necessary before said type-carriers and hammers may be operated, adding wheels operated incidentally to the operation of said type-carriers to add the numbers recorded, and transfer devices disconnected from said type-carriers to transfer from lower to higher orders in addition, substantially as specified.

132. An adding machine comprising type-carriers, type on said type-carriers, laterally movable devices whose operation is necessary before said type-carriers may be operated, racks coöperating with said type-carriers, adding wheels operated by said racks to add numbers recorded, and transfer devices separate from said racks acting on said adding wheels to transfer from lower to higher orders in the process of addition, substantially as specified.

133. The combination with laterally movable wheels, and mechanism operable to set said wheels to represent numbers, of recording mechanism operable to record said numbers and to restore said wheels to idle position, adding mechanism controlled by said recording mechanism, and means whereby the total represented in the said adding mechanism may be recorded, substantially as specified.

134. The combination with laterally movable wheels, and mechanism operable to set said wheels to represent numbers, of recording mechanism operable to record said numbers and restore said wheels to idle position, adding mechanism operated by said recording mechanism to add the numbers recorded, and means for coöperating said adding and recording mechanisms to record any total contained in said adding mechanism, substantially as described.

135. An adding and writing machine comprising words recording mechanism, type-carriers operable to record numbers, and a series of laterally movable wheels whose operation is necessary before said type-carriers may be operated, substantially as specified.

136. An adding and writing machine comprising words recording mechanism, type-carriers operable to record numbers, adding wheels controlled by said type carriers to add the numbers recorded, and a series of laterally movable wheels whose operation is necessary before said type-carriers may be operated, substantially as specified.

137. A machine comprising words recording mechanism, type carriers separate from said words recording mechanism, hammers coöperatively related to said type-carriers, laterally movable elements whose operation is necessary before said type-carriers and hammers may be operated, adding wheels controlled by said type carriers to add the numbers recorded, and transfer devices detached from said type-carriers to transfer from lower to higher orders in the process of addition.

138. A machine comprising words recording mechanism, type carriers, stops for said type-carriers, a series of ten keys, mechanism whereby said keys when selectively operated will set said stops to represent any desired numbers, and mechanism for operating said type-carriers to record the numbers represented by said stops, substantially as specified.

139. An adding and recording machine comprising a series of typewriter keys arranged in a key-board, typewriting mechanism operated by said keys, a series of type-carriers, a series of stops to limit movement of said type-carriers, a series of numeral keys arranged in the same key-board with said typewriter keys and whose operation is necessary before said stops will limit movement of said type-carriers, and mechanism for operating said type carriers, substantially as specified.

140. A machine comprising words recording mechanism, type-carriers, stops for said type-carriers, a series of ten keys operable selectively to set any of said stops to represent numbers, mechanism for operating said type-carriers to record said numbers, adding wheels controlled by said type-carriers, and transfer devices for said adding wheels, substantially as specified.

141. A machine comprising words recording mechanism, type carriers, a platen arranged to feed paper to said recording mechanism and said type-carriers, a series of laterally movable elements whose operation is necessary before said type-carriers may be operated, means for setting said laterally movable elements to represent numbers, racks associated with said type carriers, mechanism for operating said type carriers to record the numbers represented by said laterally movable elements, adding wheels operated by said racks, and transfer devices coöperating with said adding wheels, substantially as specified.

142. An adding machine comprising type-carriers, racks operating with said type-carriers, stops settable to limit movement of said racks and type-carriers, keys, means controlled by said keys for setting said stops, means for automatically restoring each key to idle position after operation and before operation of the succeeding key, and means for operating said type-carriers to record any desired numbers, substantially as specified.

143. An adding machine comprising type-carriers, racks associated with said type-carriers, stops for said type-carriers, keys, means controlled by said keys for setting said stops to represent numbers, automatic means for restoring each key to idle position before operation of the succeeding key, hammers coöperating with said type-carriers, means holding said hammers, means for releasing a number of hammers equal to the number of type-carriers operated, and means for adding the numbers recorded, substantially as specified.

144. An adding and writing machine comprising a platen arranged to hold paper, typewriting mechanism operable to record on said paper, and a series of keys arranged in a key-board for operating said typewriting mechanism, in combination with mechanism for recording numbers on paper on said platen, a laterally movable device whose operation is necessary before said numbers recording mechanism may be operated, and a single row of numeral keys arranged in the same key-board with said typewriter keys for causing said laterally movable device to permit said numbers recording mechanism to operate.

145. An adding and writing machine comprising a platen arranged to hold paper, typewriting mechanism operable to record on paper on said platen, and typewriter keys arranged in a key-board for operating said typewriting mechanism, in combination with a series of type-carriers separate from said typewriting mechanism operable to record numbers on paper on said platen, a laterally movable device whose operation is necessary before said type-carriers may be operated, hammers for driving the type on said type-carriers to record, and a single row of numeral keys in front of said typewriter keys controlling lateral movement of said laterally movable device, substantially as specified.

146. In an adding and recording machine, a platen arranged to hold paper, typewriting mechanism for recording on paper on said platen, typewriter keys arranged in a key-board for operating said typewriting mechanism, type-carriers separate from said typewriting mechanism, type loosely mounted on said type-carriers, hammers for driving said type to print, latches holding said hammers, a laterally movable device whose operation is necessary before said type-carriers and hammers may be operated, and ten numeral keys arranged in a row in the same key-board with said typewriter keys for causing said laterally movable device to operate, substantially as specified.

147. In an adding machine, a series of type-carriers, a series of stops for limiting movement of said type-carriers, keys, mechanism operated by said keys for setting said stops, and means for engaging and disengaging said stops from said type-carriers, substantially as specified.

148. In an adding machine, the combination with type-carriers operable to record numbers, a hammer for each type-carrier, springs for driving said hammers against the type on said type carriers, pawls holding said hammers in idle position, tripping devices for said pawls, means for positioning said tripping devices and means operated by said type-carriers respectively for positioning said tripping devices, means for operating the tripping devices after they have been positioned, adding wheels operated by said type-carriers to add the numbers recorded, and transfer mechanism acting on said adding wheels to transfer from lower to higher orders in process of addition, substantially as specified.

149. In an adding machine, the combination with type-carriers, racks, a laterally movable device whose operation is necessary before said type-carriers may be operated, and a series of type-driving hammers which may be operated only after said laterally movable device has been moved, of a series of adding wheels operable to add the numbers recorded, transfer devices detached from said type-carriers, and means for engaging said adding wheels alternately with said racks and with said transfer devices for purposes of addition and transfer, substantially as specified.

150. In an adding machine, the combination with a series of type-carriers, racks arranged to move with said type-carriers, printing hammers for driving the type on said type-carriers to print, and a laterally movable device whose operation is necessary before said type-carriers and hammers may be operated, of adding wheels, transfer devices for said adding wheels separate from said racks, and means for moving said adding wheels from said racks to said transfer devices and from said transfer devices to said racks, for purposes of addition, substantially as specified.

151. In an adding machine, a series of type-carriers, racks in connection with said type-carriers, a laterally movable lock device holding said racks in idle position, means for moving said lock device laterally to release said racks, adding mechanism operated by said racks, mechanism for operating said adding mechanism and said racks and said type-carriers to record any total represented in said adding mechanism, and means for disengaging said lock device from said racks independently of lateral movement of said lock device to permit operation of said adding wheels and said racks and said type-carriers as aforesaid, substantially as specified.

In testimony whereof, I have signed my name to this specification in the presence of two witnesses.

HUBERT HOPKINS.

Witnesses:
E. J. GANTZ,
J. D. RIPPEY.